(12) United States Patent
Sano et al.

(10) Patent No.: US 11,327,029 B2
(45) Date of Patent: May 10, 2022

(54) X-RAY IMAGING DEVICE

(71) Applicant: Shimadzu Corporation, Kyoto (JP)

(72) Inventors: Satoshi Sano, Kyoto (JP); Koichi Tanabe, Kyoto (JP); Kenji Kimura, Kyoto (JP); Yukihisa Wada, Kyoto (JP); Satoshi Tokuda, Kyoto (JP); Taro Shirai, Kyoto (JP); Takahiro Doki, Kyoto (JP); Akira Horiba, Kyoto (JP); Naoki Morimoto, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 65 days.

(21) Appl. No.: 17/052,486

(22) PCT Filed: Jan. 22, 2019

(86) PCT No.: PCT/JP2019/001923
§ 371 (c)(1),
(2) Date: Nov. 2, 2020

(87) PCT Pub. No.: WO2019/220689
PCT Pub. Date: Nov. 21, 2019

(65) Prior Publication Data
US 2021/0172885 A1  Jun. 10, 2021

(30) Foreign Application Priority Data

May 16, 2018 (JP) .............................. JP2018-094723

(51) Int. Cl.
*G01N 23/041* (2018.01)
*G06T 7/73* (2017.01)
(Continued)

(52) U.S. Cl.
CPC ......... *G01N 23/041* (2018.02); *G01N 23/083* (2013.01); *G06T 5/50* (2013.01);
(Continued)

(58) Field of Classification Search
CPC ............... G01N 23/041; G01N 23/083; G01N 2223/303; G01N 2223/401;
(Continued)

(56) References Cited

U.S. PATENT DOCUMENTS

2018/0356355 A1   12/2018   Momose et al.

FOREIGN PATENT DOCUMENTS

JP    2017044603 A    3/2017
WO   WO-2014030115 A1 *  2/2014  ............. A61B 6/484

OTHER PUBLICATIONS

Written Opinion for PCT application PCT/JP2019/001923 dated Apr. 16, 2019.

* cited by examiner

*Primary Examiner* — David P Porta
*Assistant Examiner* — Mamadou Faye
(74) *Attorney, Agent, or Firm* — Muir Patent Law, PLLC

(57) ABSTRACT

The X-ray imaging device (100) is provided with an X-ray source (1), a plurality of gratings, a moving mechanism (8), and an image processing unit (6). The image processing unit (6) is configured to generate a phase-contrast image (16) by associating a pixel value in each pixel of a subject (T) in a plurality of subject images (10) with phase values of a Moire fringe (30) at each pixel and aligning the pixel of the subject of the same position in the plurality of subject images.

9 Claims, 13 Drawing Sheets

(51) Int. Cl.
*G06T 7/33* (2017.01)
*G01N 23/083* (2018.01)
*G06T 5/50* (2006.01)

(52) U.S. Cl.
CPC .................. *G06T 7/33* (2017.01); *G06T 7/74* (2017.01); *G01N 2223/303* (2013.01); *G01N 2223/401* (2013.01); *G06T 2207/10116* (2013.01); *G06T 2207/30204* (2013.01)

(58) Field of Classification Search
CPC ....... G01N 2223/1016; G01N 2223/32; G01N 2223/3301; G01N 2223/3308; G01N 2223/612; G06T 5/50; G06T 7/33; G06T 7/74; G06T 2207/10116; G06T 2207/30204
See application file for complete search history.

First embodiment

First embodiment

First embodiment

First embodiment

First embodiment

First Embodiment

First embodiment

First embodiment

First embodiment

Phase-contrast image generation processing

Second embodiment

Second embodiment

Phase-contrast image generation processing

Third embodiment

Third embodiment

Third embodiment

Third embodiment

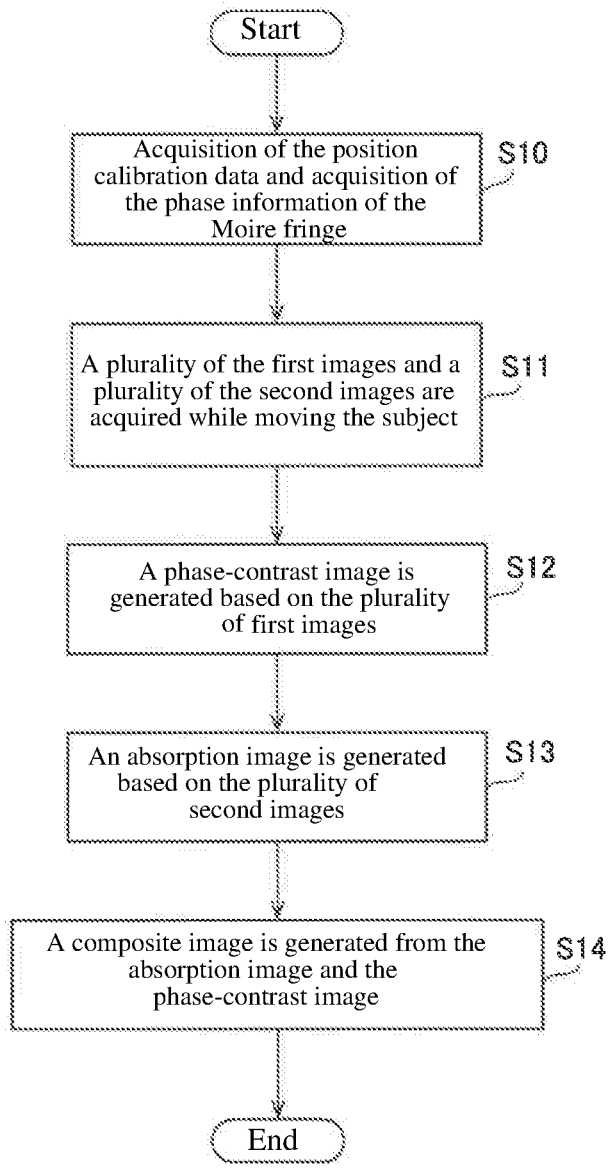

X-RAY IMAGING DEVICE

TECHNICAL FIELD

The present invention relates to an X-ray imaging device, and particularly to an X-ray imaging device for imaging a subject while moving the subject.

BACKGROUND ART

Conventionally, an X-ray imaging device for imaging a subject while moving the subject is known. Such an X-ray imaging device is disclosed, for example, in Japanese Unexamined Patent Application Publication No. 2017-44603.

In recent years, there is a need of an X-ray imaging device for substances, such as, e.g., biological soft tissues and polymer materials. Since a biological soft tissue, a polymer material, or the like is small in the X-ray absorption, it is difficult to capture a high-contrast image by conventional X-ray imaging in which an image is formed based on the contrast of the X-ray absorption amount since the X-ray absorption is low. As a technique for imaging a biological soft tissue, a polymer material, etc., with low X-ray absorption, a technique called a fringe scanning method is known. A fringe scanning method is a method in which imaging is performed while translating one of a plurality of gratings at a predetermined pitch, an intensity signal curve is generated based on the X-ray intensity detected for each pixel, and an image is generated based on the generated intensity signal curve.

A conventional fringe scanning method has a disadvantage that the visual field size is limited to the size of the grating because imaging is performed while translating the grating. Further, the grating used in the fringe scanning method is a grating narrow in grating period and high in aspect ratio, and therefore it is difficult to generate a single grating having a large area with high accuracy. As a method of obtaining a grating with a large area, it is conceivable to increase the area by bonding a plurality of gratings, but there is a disadvantage that an artifact occurs at the border where gratings are bonded. Further, in a conventional fringe scanning method, since the user is required to remove a subject in order to capture a correction image, the interval between the imaging of the subject and the imaging of the correction image becomes likely to be longer. If the interval between the imaging of the subject and the imaging of the correction image becomes longer, thermal variations occur in the grating due to the heat from the X-ray source, etc. If thermal variations occur in the grating, there is a disadvantage that the imaging conditions change between when imaging the subject and when imaging the correction image, causing deterioration when correcting. Furthermore, in the case of performing image capturing while moving a subject by a conventional fringe scanning method, there is a disadvantage in that the time to move a subject becomes a wasteful time, increasing the imaging time as a whole, which in turn increases the exposure.

Therefore, in order to solve the above-described disadvantages, the X-ray imaging device disclosed in Japanese Unexamined Patent Application Publication No. 2017-44603 is configured to perform image capturing while moving a subject. Specifically, the X-ray imaging device disclosed in Japanese Unexamined Patent Application Publication No. 2017-44603 is provided with an X-ray source, a grating group including a first grating, a second grating, and a third grating, a detection unit, a conveyance unit for moving a subject, a pixel calculation unit, and an image calculation unit. The X-ray imaging device disclosed in Japanese Unexamined Patent Application Publication No. 2017-44603 is configured to generate a phase-contrast image including an absorption image, a phase differential image, and a dark-field image by capturing a plurality of images while moving a subject in the periodic direction of a Moire fringe caused by a plurality of gratings irradiated with X-rays. Note that an absorption image is an image generated based on attenuation of X-rays caused when the X-rays pass through a subject. Also note that a phase differential image is an image generated based on a phase deviation of X-rays caused when the X-rays pass through a subject. A dark-field image is a visibility image acquired by a change in visibility based on the small-angle scattering of an object. The dark-field image is also called a small-angle scattering image. The "visibility" refers to sharpness.

In Japanese Unexamined Patent Application Publication No. 2017-44603, the pixel calculation unit is configured to judge the same pixel of a subject reflected in a plurality of images belongs to which of six segmented regions obtained by dividing a region of one period of a Moire fringe by six. Further, the pixel calculation unit is configured to acquire an average value of pixel values of pixels belonging to each region in the region to which the same pixel of a subject belongs. The image calculation unit generates a phase-contrast image using an average value of the pixel values acquired by the pixel calculation unit.

PRIOR ART DOCUMENT

Patent Document

Patent Document 1: Japanese Unexamined Patent Application Publication No. 2017-44603

SUMMARY OF THE INVENTION

Problems to be Solved by the Invention

However, in Japanese Unexamined Patent Application Publication No. 2017-44603, since a phase-contrast image is generated using an average value of pixel values of pixels included in each region, an error occurs between the pixel value of each pixel in each image and the pixel value used for generating the phase-contrast image (average value). Therefore, there is a problem that the image quality of the resulting phase-contrast image is deteriorated.

The present invention has been made to solve the above-described problems, and an object of the present invention is to provide an X-ray imaging device capable of suppressing deterioration of image quality of a phase-contrast image due to an error occurring in a pixel value used for generating the phase-contrast image.

Means for Solving the Problem

In order to achieve the above-described object, the X-ray imaging device according to one aspect of the present invention includes:

an X-ray source;

a detector configured to detect X-rays emitted from the X-ray source;

a plurality of gratings arranged between the X-ray source and the detector, the plurality of gratings including a first grating configured to be irradiated with X-rays from the X-ray source and a second grating configured to be irradiated with X-rays from the first grating;

a moving mechanism configured to move a subject or an imaging system along a direction in which the plurality of gratings extends, the imaging system being composed of the X-ray source, the detector, and the plurality of gratings; and an image processing unit configured to generate a phase-contrast image based on a signal detected by the detector, wherein the image processing unit is configured to:

based on a plurality of images captured by relatively moving the subject and the imaging system and phase information of the Moire fringe generated in the plurality of images, associate a pixel value of each pixel on which a subject appears in the plurality of images with a phase value of a Moire fringe in a corresponding pixel; and generate the phase-contrast image by aligning a pixel on which the subject appears on the corresponding position in the plurality of images based on position information of the pixel on which the subject appears on the corresponding position in the plurality of images and a pixel value of each pixel associated with the phase value.

In the X-ray imaging device according to one aspect of the present invention, as described above, the image processing unit is configured to generate a phase-contrast image by aligning the pixel of the subject of the same position in a plurality of images captured while relatively moving the subject and the imaging system, based on the phase value and the pixel value of each pixel associated with the phase value. With this, it is possible to generate the phase-contrast image in which the pixel value of the pixel of the subject of the same position in each image and each phase value corresponding to the pixel of the subject of the same position in each image are associated. Therefore, it is possible to generate a phase-contrast image using the pixel value of each pixel reflecting the same position, compared with the case in which a phase-contrast image is generated using the average value of the pixel values contained in each region acquired by segmenting the region of one period of a Moire fringe. Consequently, it is possible to suppress deterioration of the image quality of the phase-contrast image due to an error that occurred in the pixel value used to generate the phase-contrast image.

Further, for example, as a correction image, even in the case of performing imaging without placing a subject, since it is possible to relatively move the subject and the imaging system, before or after the relative movement of the subject and the imaging system, the subject can be arranged at a position other than the imaging region. Therefore, as in a conventional fringe scanning method in which a grating is moved, since the user is not required to remove the subject from the imaging region in order to capture the correction image, compared with a conventional fringe scanning method, it is possible to shorten the time interval between the imaging capturing of the phase-contrast image and the imaging capturing of the correction image. As a result, it is possible to suppress the change of the imaging conditions between the image capturing, so that it is possible to suppress deterioration of the image quality of the phase-contrast image after correction. In addition, for example, in cases where it is desired to image a subject whose size in the moving direction of the subject is larger than the size of the grating in the moving direction of the subject, it is required to increase the area of the second grating in a conventional fringe scanning method. Since the second grating used in the fringe scanning method must have a narrow pitch and a high aspect ratio, it is difficult to produce a second grating which is a single grating and has a large area. Therefore, for example, it is possible to increase the area by bonding gratings, but an artifact occurs at the bonding interface. On the other hand, in the present invention, by configuring as described above, the image capturing can be performed while moving a subject, so that the entire subject can be imaged without using a grating having an enlarged area. Consequently, it is possible to suppress an artifact that occurs when using a grating enlarged in the area by, for example, bonding gratings.

In the X-ray imaging device according to the above-described one aspect of the present invention, preferably, the image processing unit is configured to generate position calibration data to be used for aligning the pixel of the subject of the same position in the plurality of images based on a plurality of position calibration images captured while relatively moving a marker and the imaging system. With this configuration, by using the position calibration data, it becomes possible to acquire the position in each image of the pixel of the subject of the same position, it is possible to calculate the movement amount of the subject. As a result, for example, even in cases where the movement amount of the subject and the movement amount of the marker are not the same, the movement amount of the subject can be acquired, so that the alignment of the pixel of the subject of the same position in a plurality of images can be performed.

In this case, preferably, the position calibration data is generated based on a command value related to a movement amount inputted to the moving mechanism when relatively moving the marker and the imaging system by the moving mechanism and a movement amount of the marker in the position calibration image or the imaging system when the marker and the imaging system are relatively moved based on the command value. With this configuration, even if there occurred an error between the command value related to the movement amount inputted to the moving mechanism and the movement amount of the marker or the imaging system, an accurate movement amount can be acquired by the position calibration data. As a result, it becomes possible to accurately align the pixel of the subject of the same position in a plurality of images, so that it is possible to further suppress deterioration of the image quality of the resulting phase-contrast image.

In the configuration in which the position calibration data is generated based on the command value related to the movement amount inputted to the moving mechanism and the movement amount of the marker in the position calibration image, preferably, the position calibration data is generated by acquiring an approximate expression indicating a relationship between the command value and the movement amount of the marker or the imaging system based on a position of each pixel of the marker of the same position in the plurality of position calibration images. With this configuration, by acquiring the approximate expression based on the position of each pixel of the marker of the same position in the plurality of position calibration images, the relationship between the command value related to the movement amount to a position different from the position where the plurality of position calibration images are captured and the movement amount of the marker or the imaging system can be calculated using the approximate expression. Consequently, for example, even in cases where the marker or the imaging system is moved to a position different from the position where the marker or the imaging system is moved when imaging the subject, it is possible to acquire the movement amount of the subject or the imaging system.

In the configuration in which the position calibration data is generated based on the command value related to the movement amount inputted to the moving mechanism and the movement amount of the marker in the position calibration image, preferably, the image processing unit is configured to generate the phase-contrast image based on an intensity signal curve of pixel values acquired by associating each phase value of each pixel of the subject of the same position in the plurality of images with each pixel value thereof in a one-to-one relationship. With this configuration, since the phase value and the pixel value of each pixel of the subject of the same position in the plurality of images correspond to each other in a one-to-one relationship, as compared with the case in which the average value of the phase value and the pixel value is used, the error of the intensity signal curve can be reduced. Consequently, it is possible to further reduce an error in the resulting phase-contrast image.

In the X-ray imaging device according to the one aspect of the present invention, preferably, the moving mechanism is configured to continuously move the subject or the imaging system when imaging the subject, and the image processing unit is configured to generate the phase-contrast image based on the acquired continuous images. With this configuration, in generating continuous phase-contrast images, unlike a conventional fringe scanning method of generating continuous phase-contrast images by repeating, for example, the movement of the subject or the imaging system and the image capturing, by performing the image capturing while continuously moving the subject or the imaging system, it is possible to generate continuous phase-contrast images. As a result, the image capturing time can be shortened as compared with a conventional fringe scanning method.

In the X-ray imaging device according to the above-described one aspect of the present invention, preferably, the detector includes a first detection region for detecting X-rays arrived by passing through the first grating and a second detection region for detecting X-rays arrived without passing through the first grating, the moving mechanism is configured to relatively move the subject and the imaging system so that the subject passes through the first detection region and the second detection region, respectively, and the image processing unit is configured to generate the phase-contrast image based on a plurality of first images acquired in the first detection region and generate an absorption image based on a plurality of second images acquired in the second detection region. With this configuration, without performing image capturing by retracting a plurality of gratings, or without performing image capturing using another imaging device equipped with no gratings, it is possible to generate an absorption image captured without interposing a grating and a phase-contrast image captured using a grating. The X-rays reaching the second detection region reaches the detector without passing through a grating, so it is possible to suppress the attenuation of the X-rays by the grating, in particular, the attenuation of the X-rays by the low-energy side. As a result, the contrast of the absorption image generated by the X-rays reaching the second detection region can be improved as compared with the absorption image generated by the X-rays reaching the first detection region.

In this case, preferably, the image processing unit is configured to generate a composite image in which the phase-contrast image and the absorption image are composed. With this configuration, it is possible to obtain a composite image in which a high-contrast absorption image generated by the X-rays detected in the second detection region and a phase-contrast image. As a result, the contrast of the absorption image can be improved, so that the image quality of the composite image can be improved.

In the X-ray imaging device according to the one aspect of the present invention, preferably, the plurality of gratings further includes a third grating arranged between the X-ray source and the first grating. With this configuration as described above, the coherence of the X-rays emitted from the X-ray source can be enhanced by the third grating. As a result, since it becomes possible to form a self-image of the first grating without depending on the focal diameter of the X-ray source, the degree of flexibility in selecting the X-ray source can be improved.

Effects of the Invention

According to the present invention, as described above, it is possible to provide an X-ray imaging device capable of suppressing deterioration of the image quality of the phase-contrast image due to an error occurring in a pixel value used for generating the phase-contrast image.

BRIEF DESCRIPTION OF THE DRAWINGS

FIG. 20 is a flowchart for generation processing of a phase-contrast image by the X-ray imaging device according to the third embodiment.

EMBODIMENTS FOR CARRYING OUT THE INVENTION

Hereinafter, embodiments in which the present invention is embodied will be described with reference to the attached drawings.

First Embodiment

Referring to FIG. 1 to FIG. 11, the configuration of the X-ray imaging device 100 according to a first embodiment of the present invention and the method in which the X-ray imaging device 100 generates a phase-contrast image 16 will be described.

(Configuration of X-Ray Imaging Device)

First, referring to FIG. 1, a configuration of an X-ray imaging device 100 according to a first embodiment will be described.

Figure 1:
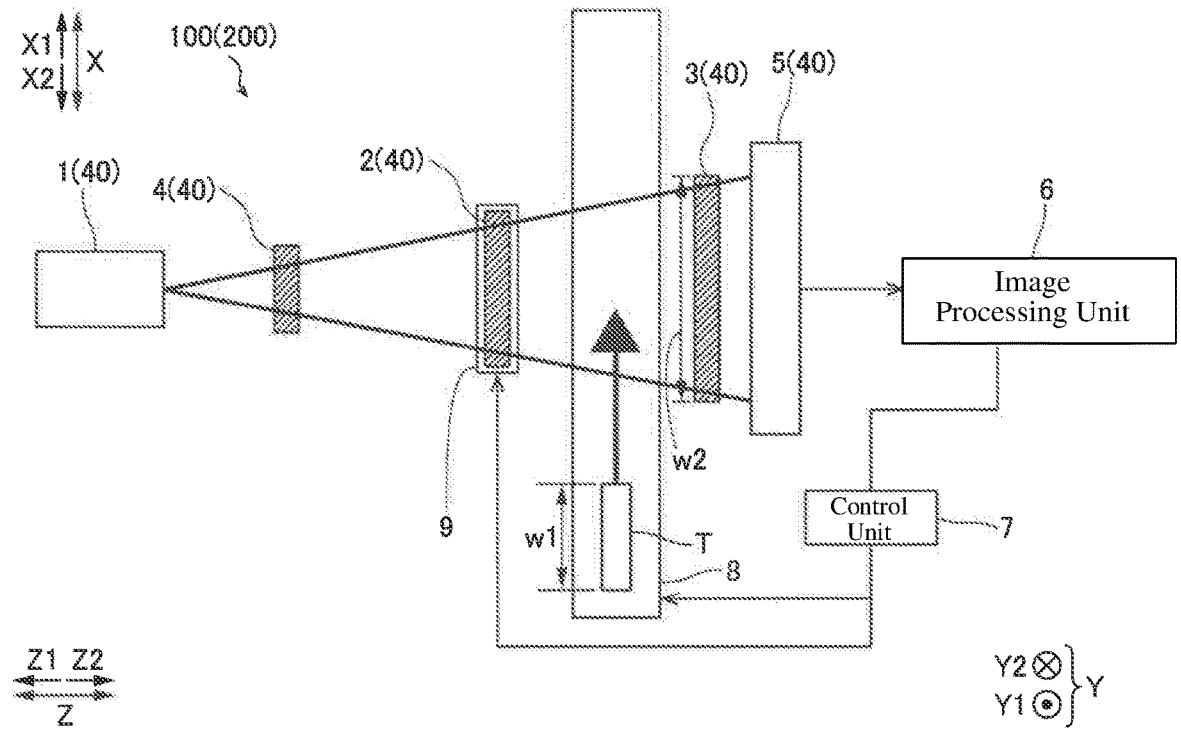
FIG. 1 is a schematic diagram showing an entire configuration of an X-ray imaging device according to a first embodiment.

As shown in FIG. 1, the X-ray imaging device 100 is a device for imaging an inside of a subject T utilizing a Talbot effect. The X-ray imaging device 100 can be used to image an inside of a subject T as an object, for example, in a non-destructive inspection application.

FIG. 1 is a view of the X-ray imaging device 100 as viewed in the Y-direction. As shown in FIG. 1, the X-ray imaging device 100 is provided with an X-ray source 1, a first grating 2, a second grating 3, a third grating 4, a detector 5, an image processing unit 6, a control unit 7, a moving mechanism 8, and a grating moving mechanism 9. Note that, in this specification, the direction from the X-ray source 1 toward the first grating 2 is defined as a Z2-direction, the opposite direction thereof is defined as a Z1-direction. The up-down direction in a plane orthogonal to the Z-direction is defined as an X-direction, the upward direction thereof is defined as an X1-direction, and the downward direction thereof is defined as an X2-direction. Further, the right-left direction in a plane orthogonal to the Z-direction is defined as a Y-direction, the direction toward the back of the paper plane in FIG. 1 is defined as a Y2-direction, and the direction toward the front side of the paper plane in FIG. 1 is defined as a Y1-direction. Further, the subject T to be imaged in the first embodiment is an example in which the size w1 of the subject T in the X-direction is smaller than the width w2 of the second grating 3 in the X-direction.

The X-ray source 1 generates X-rays when a high voltage is applied. The X-ray source 1 is configured to emit the generated X-rays in the Z2-direction.

The first grating 2 is arranged between the X-ray source 1 and the second grating 3 and is irradiated with X-rays from the X-ray source 1. The first grating 2 is provided to form a self-image of the first grating 2 by a Talbot effect. When coherent X-rays pass through a grating in which slits are formed, an image of the grating (self-image) is formed at a position away from the grating by a predetermined distance (Talbot distance). This is called a Talbot effect.

The second grating 3 is arranged between the first grating 2 and the detector 5 and is irradiated with the X-rays that have passed through the first grating 2. The second grating 3 is arranged at a position away from the first grating 2 by a predetermined Talbot distance. The second grating 3 interferes with the self-image of the first grating 2 to form a Moire fringe 30 (see FIG. 4).

The third grating 4 is arranged between the X-ray source 1 and the first grating 2 and is irradiated with X-rays from the X-ray source 1.

The detector 5 is configured to detect X-rays, convert the detected X-rays into an electric signal, and read the converted electric signal as an image signal. The detector 5 is, for example, an FPD (Flat Panel Detector). The detector 5 is composed of a plurality of conversion elements (not shown) and pixel electrodes (not shown) arranged on the plurality of conversion elements. The plurality of conversion elements and the plurality of pixel electrodes are arranged in an array in the X-direction and the Y-direction at a predetermined period (pixel pitch). Further, the detector 5 is configured to output the acquired image signal to the image processing unit 6.

The image processing unit 6 is configured to generate a phase-contrast image 16 (see FIG. 11) based on the image signal outputted from the detector 5. The image processing unit 6 includes, for example, a processor, such as, e.g., a GPU (Graphics Processing Unit) and an FPGA (Field-Programmable Gate Array) configured for image processing.

The control unit 7 is configured to control the moving mechanism 8 to move the subject T in the X-direction. The control unit 7 is configured to control the grating moving mechanism 9 to move the first grating 2. The control unit 7 is configured to cause a Moire fringe 30 (see FIG. 4) to occur on the sensing surface of the detector 5 by controlling the grating moving mechanism 9 to adjust the position of the first grating 2. The control unit 7 includes, for example, a CPU (Central Processing Unit), a ROM (Read Only Memory), and a RAM (Random Access Memory).

The moving mechanism 8 is configured to move the subject or the imaging system 40 composed of the X-ray source 1, the detector 5, and the plurality of gratings in the X-direction under the control of the control unit 7. In the example shown in FIG. 1, the moving mechanism 8 is configured to relatively move the subject T and the imaging system 40 by moving the subject T from the X2-direction to the X1-direction. The moving mechanism 8 is configured, for example, by a belt conveyor or various kinds of linear motion mechanisms.

The grating moving mechanism 9 is configured to move the first grating 2 under the control of the control unit 7. The grating moving mechanism 9 is configured to generate a Moire fringe 30 (see FIG. 4) by adjusting the position of the first grating 2 under the control of the control unit 7. The detailed configuration in which the grating moving mechanism 9 moves the grating will be described later. Further, the grating moving mechanism 9 is holding the first grating 2.

(Structure of Each Grating)

Next, referring to FIG. 2, the structure of each of the first grating 2, the second grating 3, and the third grating 4 will be described.

Figure 2:
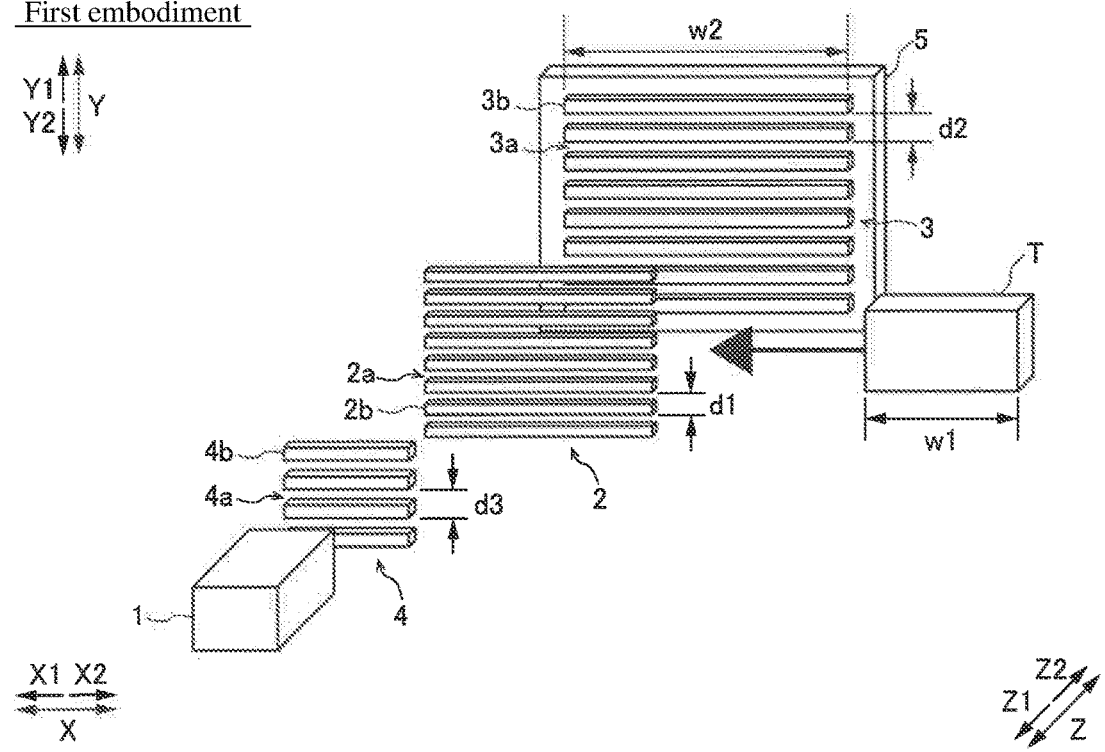
FIG. 2 is a schematic diagram for explaining an arrangement and a structure of a plurality of gratings in the X-ray imaging device according to the first embodiment.

As shown in FIG. 2, the first grating 2 has a plurality of slits 2a and a plurality of X-ray phase change portions 2b. Each slit 2a and each X-ray phase change portion 2b are arranged at a predetermined period (pitch) d1 in the Y-direction. The slit 2a and the X-ray phase change portion 2b are each formed so as to extend linearly. The slit 2a and the X-ray phase change portion 2b are each formed so as to extend in parallel with each other. The first grating 2 is a so-called phase grating.

The second grating 3 has a plurality of X-ray transmission portions 3a and a plurality of X-ray absorption portions 3b. The X-ray transmission portion 3a and the X-ray absorption portion 3b are arranged in the Y-direction at a predetermined period (pitch) d2. The X-ray transmission portion 3a and the X-ray absorption portion 3b are each formed so as to extend linearly. The X-ray transmission portion 3a and the X-ray absorption portion 3b are each formed so as to extend in parallel with each other. The second grating 3 is a so-called absorption grating. The first grating 2 and the second grating 3 are gratings with distinct roles, but the slit 2a and the X-ray transmission portion 3a each allow X-rays to pass through. The X-ray absorption portion 3b shields X-rays. Further, the X-ray phase change portion 2b changes the phase of X-rays by the difference of the refractive index between the X-ray phase change portion 2b and the slit 2a.

The third grating 4 has a plurality of slits 4a and a plurality of X-ray absorption portions 4b arranged at a predetermined period (pitch) d3 in the Y-direction. The slit 4a and the X-ray absorption portion 4b are each formed so as to extend linearly. The slit 4a and the X-ray absorption portion 4b are each formed so as to extend in parallel with each other. Further, the third grating 4 is configured to cause the X-rays that have passed through each slit 4a to be served as a line light source corresponding to the position of each slit 4a.

(Grating Moving Mechanism)

Figure 3:
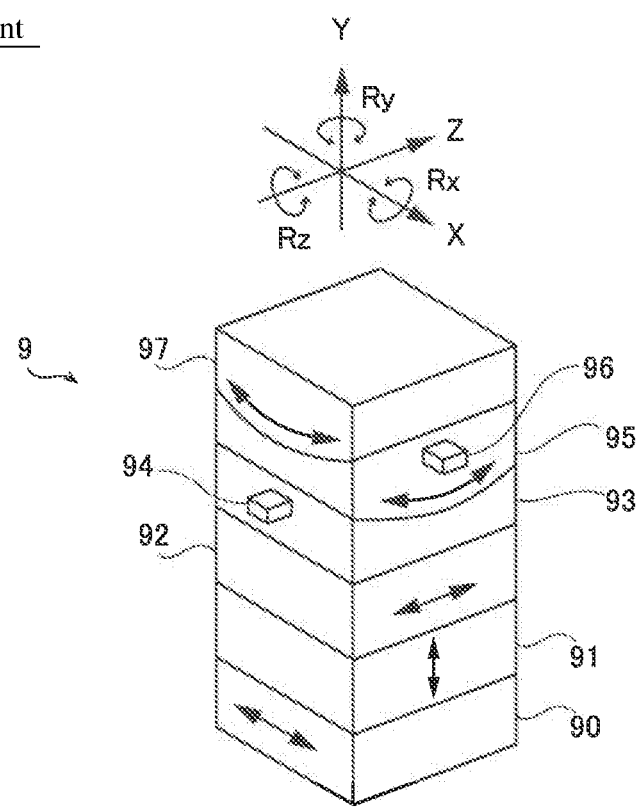
FIG. 3 is a schematic diagram for explaining a configuration of a grating position adjustment mechanism according to the first embodiment.

As shown in FIG. 3, the grating moving mechanism 9 is configured to move the first grating 2 in the X-direction, the Y-direction, the Z-direction, the rotational direction Rz about the axis of the Z-direction, the rotational direction Rx about the axis of the X-direction, and the rotational direction Ry about the axis of the Y-direction. Specifically, the grating moving mechanism 9 includes an X-direction linear motion mechanism 90, a Y-direction linear motion mechanism 91, a Z-direction linear motion mechanism 92, a linear motion mechanism connecting unit 93, a stage support unit drive unit 94, a stage support unit 95, a stage driving unit 96, and a stage 97. The X-direction linear motion mechanism 90 is configured to be movable in the X-direction. The X-direction linear motion mechanism 90 includes, for example, a motor and the like. The Y-direction linear motion mechanism 91 is configured to be movable in the Y-direction. The Y-direction linear motion mechanism 91 includes, for example, a motor and the like. The Z-direction linear motion mechanism 92 is configured to be movable in the Z-direction. The Z-direction linear motion mechanism 92 includes, for example, a motor and the like.

The grating moving mechanism 9 is configured to move the first grating 2 in the X-direction by the operation of the X-direction linear motion mechanism 90. Further, the grating moving mechanism 9 is configured to move the first grating 2 in the Y-direction by the operation of the Y-direction linear motion mechanism 91. Further, the grating moving mechanism 9 is configured to move the first grating 2 in the Z-direction by the operation of the Z-direction linear motion mechanism 92.

The stage support unit 95 is supporting the stage 97 from the below (Y1-direction). The stage driving unit 96 is configured to reciprocate the stage 97 in the X-direction. The bottom portion of the stage 97 is formed in a convex curved surface shape toward the stage support unit 95 and is configured to rotate about the axial line of the Z-direction (in the Rz-direction) by reciprocating in the X-direction. Further, the stage support unit drive unit 94 is configured to reciprocate the stage support unit 95 in the Z-direction. The bottom of the stage support unit 95 is formed in a convex curved surface shape toward the linear motion mechanism connecting unit 93 and is configured to be rotatable about the axis line (Rx-direction) of the X-direction by being reciprocated in the Z-direction. Further, the linear motion mechanism connecting unit 93 is provided to the X-direction linear motion mechanism 90 rotatable about the axis of the Y-direction (Ry-direction). Thus, the grating moving mechanism 9 can rotate the grating about the central axis of the Y-direction.

(Generation of Phase-Contrast Image)

Next, a configuration in which the X-ray imaging device 100 according to the first embodiment generates a phase-contrast image 16 (see FIG. 11) will be described with reference to FIG. 4 to FIG. 11.

Figure 4:
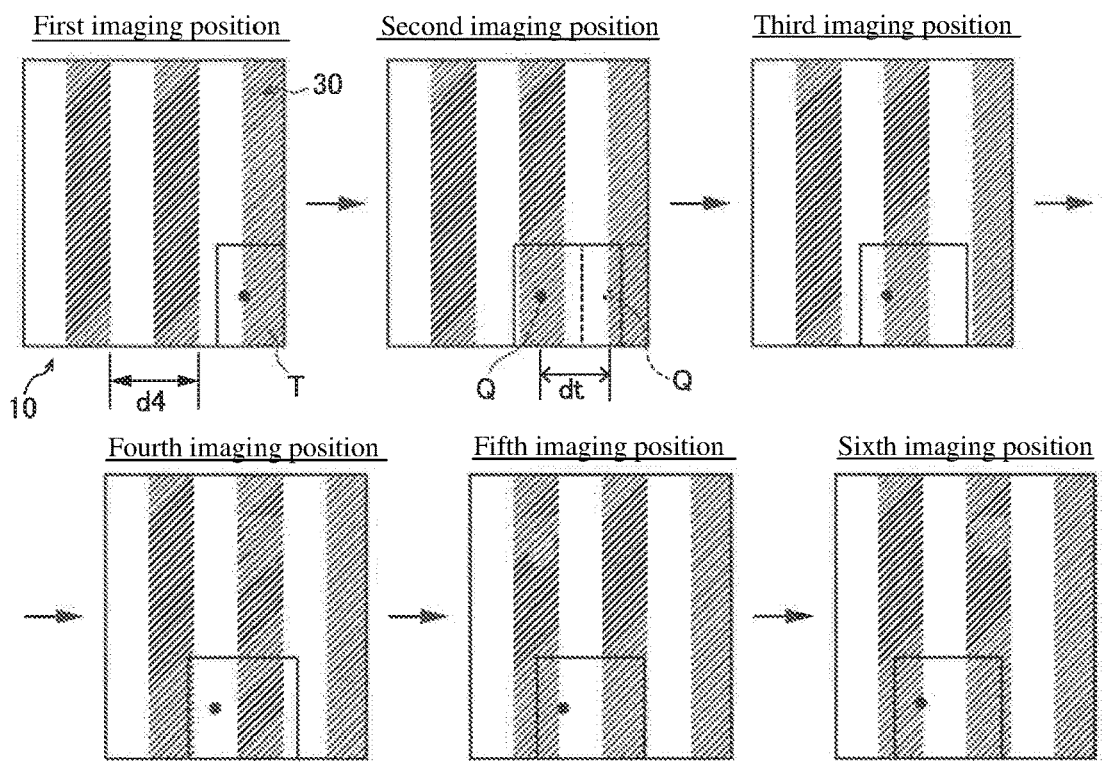
FIG. 4 is a schematic diagram of a plurality of images captured by the X-ray imaging device according to the first embodiment.

In the first embodiment, the X-ray imaging device 100 is configured to perform image capturing while moving the subject T in the X-direction. In the first embodiment, the X-ray imaging device 100 is configured to perform image capturing in a state in which a Moire fringe 30 is generated in advance. The example shown in FIG. 4 is a schematic diagram of a plurality of subject images 10 captured while linearly moving the subject T in the X-direction from the first imaging position to the sixth imaging position by the moving mechanism 8. Specifically, the example shown in FIG. 4 is an example in which imaging is performed at each position of 6 positions during which the subject T of a rectangular shape is moved from one side (right side) of the imaging range to the other side thereof (left side). At the first imaging position, since a part of the subject T in the X-direction is not arranged on the detection surface of the detector 5, a part of the subject T is not reflected in the captured subject image 10. Further, the example shown in FIG. 4 is an example showing the change in the position of the pixel Q among pixels reflecting the subject T in the plurality of subject images 10. Further, a plurality of subject images 10 is one example of "a plurality of images captured while moving a subject" recited in claims.

As shown in FIG. 4, in the first embodiment, the control unit 7 is configured to perform image capturing while moving the subject T in a state in which a Moire fringe 30 is generated. The control unit 7 moves the subject T by a predetermined movement amount dt by inputting a command value related to a movement amount for arranging the subject T at each imaging position to the moving mechanism 8. The command value related to the movement amount is, for example, the number of pulses inputted to the moving mechanism 8 when the moving mechanism 8 includes a stepping motor as a drive source. Note that, in the subject image 10 at the second imaging position of FIG. 4, in order to facilitate grasping the movement amount dt of the subject T, the position of the subject T at the first imaging position is illustrated by a broken line. By performing the image capturing while moving the subject T by the moving mechanism 8, it is possible to relatively move the Moire fringe 30 and the subject T, so that the image processing unit 6 can generate a phase-contrast image 16. Note that in the first embodiment, the subject T is moved by the moving mechanism 8 by at least one period d4 or more of the Moire fringe 30.

Here, in a conventional fringe scanning method, image capturing is performed by translating a grating by a predetermined distance acquired by dividing one period of the grating for at least a vertical component in the grating direction. Therefore, since the phase value of the Moire fringe 30 of each pixel in each image is determined by the distance that the grating is moved, a phase-contrast image 16 can be generated by acquiring the pixel value of the pixel in each image.

Figure 5:
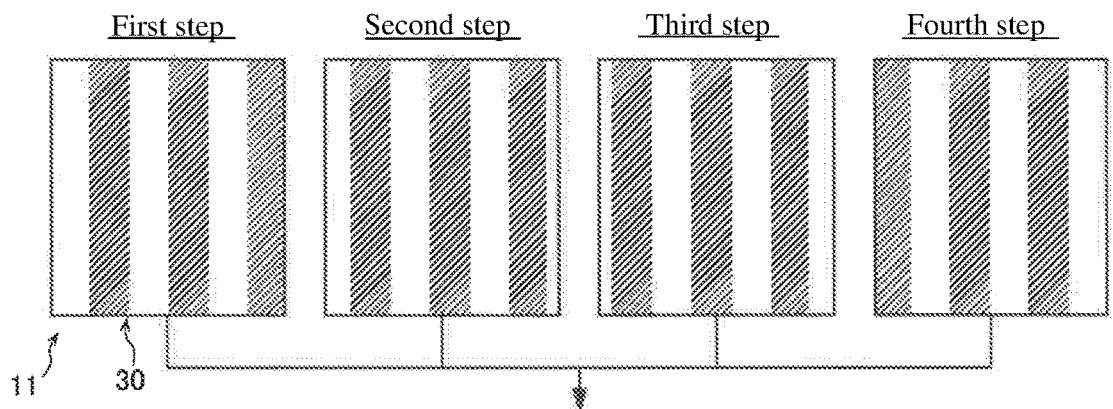
FIG. 5 is a schematic diagram for explaining a configuration in which phase information of a Moire fringe is acquired by the X-ray imaging device according to the first embodiment.
Figure 5:
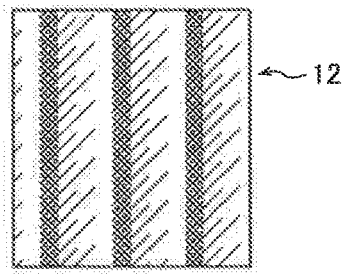

However, in the case of performing the image capturing while moving the subject T with respect to the Moire fringe 30, it is not possible to directly acquire the phase value of the pixel in each image. Thus, in the first embodiment, the image processing unit 6 is configured to acquire the phase information 12 of the Moire fringe 30 (see FIG. 5). Specifically, the X-ray imaging device 100 acquires a Moire fringe image 11 of each step as shown in FIG. 5 by translating the first grating 2 by the grating moving mechanism 9. The Moire fringe image 11 is acquired by imaging the Moire fringe 30 generated on the detection surface of the detector 5 by translating the first grating 2 and is an image reflecting a striped pattern due to the light and darkness of the pixel value of the Moire fringe 30. The image processing unit 6 is configured to acquire the phase information 12 of the Moire fringe 30 based on each Moire fringe image 11. Specifically, the Moire fringe images 11 of the first Step to the fourth Step of FIG. 5 are defined as $I_k$ (x, y), and S(x, y) is defined as shown in the following expression (1).

$$S(x, y) = \sum_{k=1}^{M} I_k(x, y)\exp\left(-\frac{2i\pi k}{M}\right) \quad (1)$$

Where "k" is the number of each Step. "M" is the number of times that the grating is translated. Further, "x" and "y" are pixel positions (coordinates) in the plane orthogonal to the irradiation axis of the X-rays on the detection plane of the detector 5.

Using the above-described expression (1), the phase information 12 of the Moire fringe 30 is represented by the following expression (2).

$$\varphi(x,y)=\arg[S(x,y)] \quad (2)$$

Here, φ(x, y) is the phase information 12 of the Moire fringe 30. In the first embodiment, a sine curve (sine-wave) may be used to fit $I_k$(x, y) as a function of k, and the phase information of the sine curve may be the phase information 12 of the Moire fringe 30.

The phase information 12 of the Moire fringe 30 is an image of a striped pattern in which the change in the phase value of the Moire fringe 30 is repeated every one period d4. Specifically, the phase information 12 of the Moire fringe 30 is an image in which the change of the phase value of the Moire fringe 30 from −π to π is illustrated in a fringe pattern. The phase information 12 of the Moire fringe 30 may be in the range of −π to π or in the range of 0 to 2π as long as the range is 2π.

In the first embodiment, the image processing unit 6 is configured to associate the pixel value of each pixel of the subject T in the plurality of subject images 10 with the phase value of the Moire fringe 30 in each pixel based on the plurality of subject images 10 captured while relatively moving the subject T and the imaging system 40 and the phase information 12 of the Moire fringe 30 generated in the plurality of subject images 10. Further, the image processing unit 6 is configured to generate a phase-contrast image 16 by aligning the pixel of the subject T of the same position in the plurality of subject images 10 based on the positional information of the pixel of the subject T of the same position in the plurality of subject images 10 and the pixel value of each pixel associated with the phase value.

In the first embodiment, the image processing unit 6 is configured to generate position calibration data and align the pixels of the subject T of the same position in a plurality of subject images 10 using the generated position calibration data.

Specifically, the image processing unit 6 is configured to generate position calibration data to be used for aligning the pixel of the subject T of the same position in a plurality of subject images 10 based on a plurality of position calibration images 13 (see FIG. 6) captured while relatively moving the marker M and the imaging system 40. The marker M may be anything as long as it absorbs X-rays. In the first embodiment, the marker M includes, for example, a wire or the like.

(Generation of Position Calibration Data)

Figure 6:
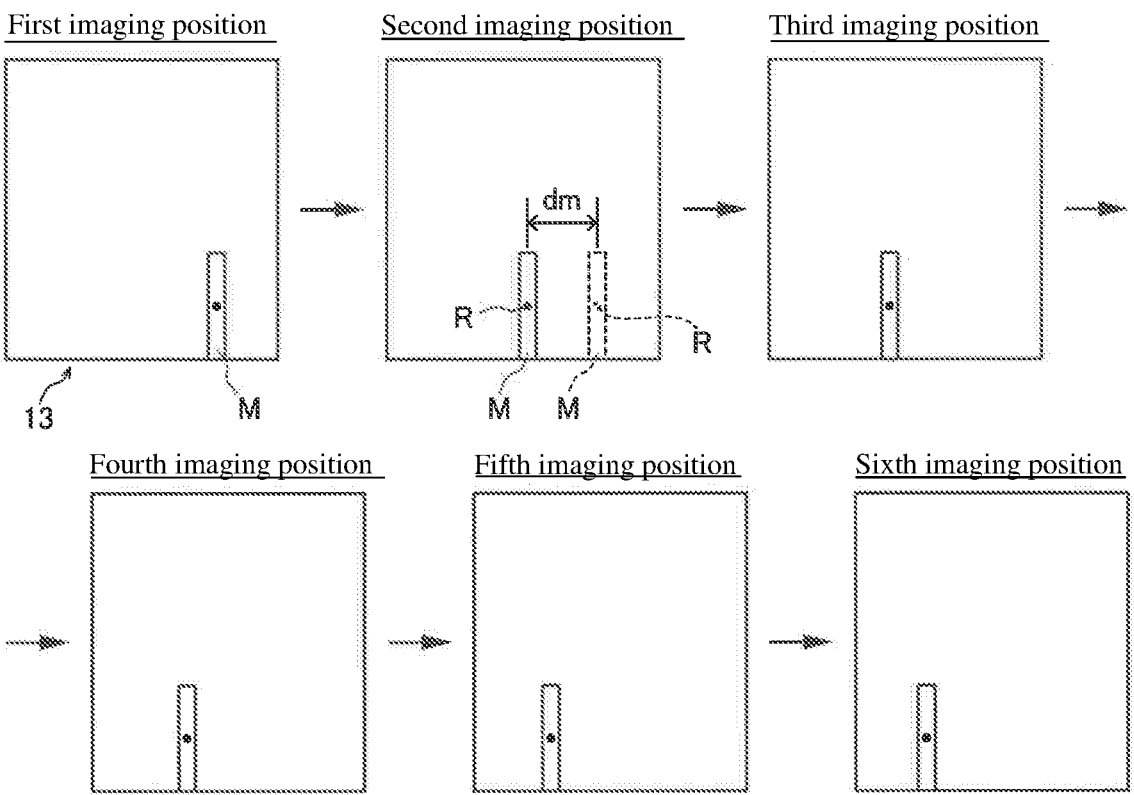
FIG. 6 is a schematic diagram of a plurality of position calibration images captured by the X-ray imaging device according to the first embodiment.

FIG. 6 is a schematic diagram of position calibration images 13 captured while moving the marker M in the X-direction by the moving mechanism 8. The position calibration image 13 shown in FIG. 6 is an example of images captured while moving the marker M from the first imaging position to the sixth imaging position. Further, in the example shown in FIG. 6, among the pixels reflecting the marker M, and the movement amount dm of the marker M is acquired by focusing on the pixel R.

The position calibration data is generated based on the command value related to the movement amount inputted to the moving mechanism 8 when relatively moving the marker M and the imaging system 40 by the moving mechanism 8 and the actual movement amount dm of the marker M in the position calibration image 13 when the marker M and the imaging system 40 are relatively moved based on the command value. Specifically, the position calibration data is generated by acquiring an approximate expression indicating the relationship between the command value and the movement amount dm of the marker M based on the position of each pixel of the marker M of the same position in a plurality of position calibration images 13.

Figure 7:
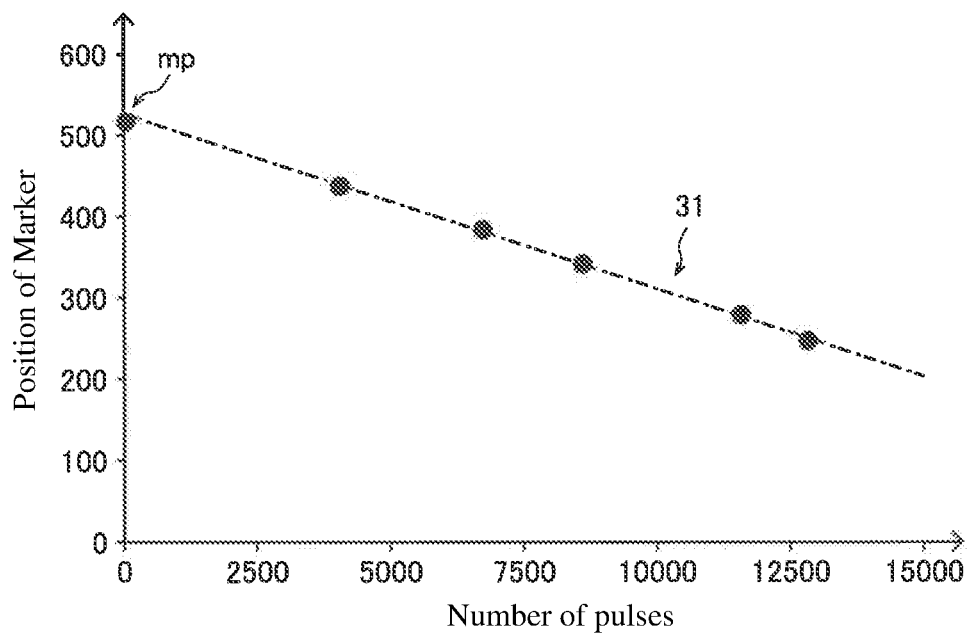
FIG. 7 is a schematic diagram for explaining the acquisition of an approximate expression for acquiring position calibration data.

FIG. 7 is a graph 31 in which the vertical axis represents the position of the marker M in each position calibration image 13 and the horizontal axis represents the command value when the marker M is moved. The control unit 7 acquires an approximate expression by linearly fitting each plot mp shown in the graph 31.

In the first embodiment, the control unit 7 acquires the following expression (3) as the position calibration data.

$$x=x_{start}+p1 \times np \quad (3)$$

Where x is the position in each image of the pixel of the subject T of the same position. $x_{start}$ is a position of a pixel in the first imaging position among the pixels of the subject T of the same position. p1 is a slope of the approximate expression. np is a command value (the number of pulses) to be inputted to the moving mechanism 8 when moving the subject T.

Figure 8:
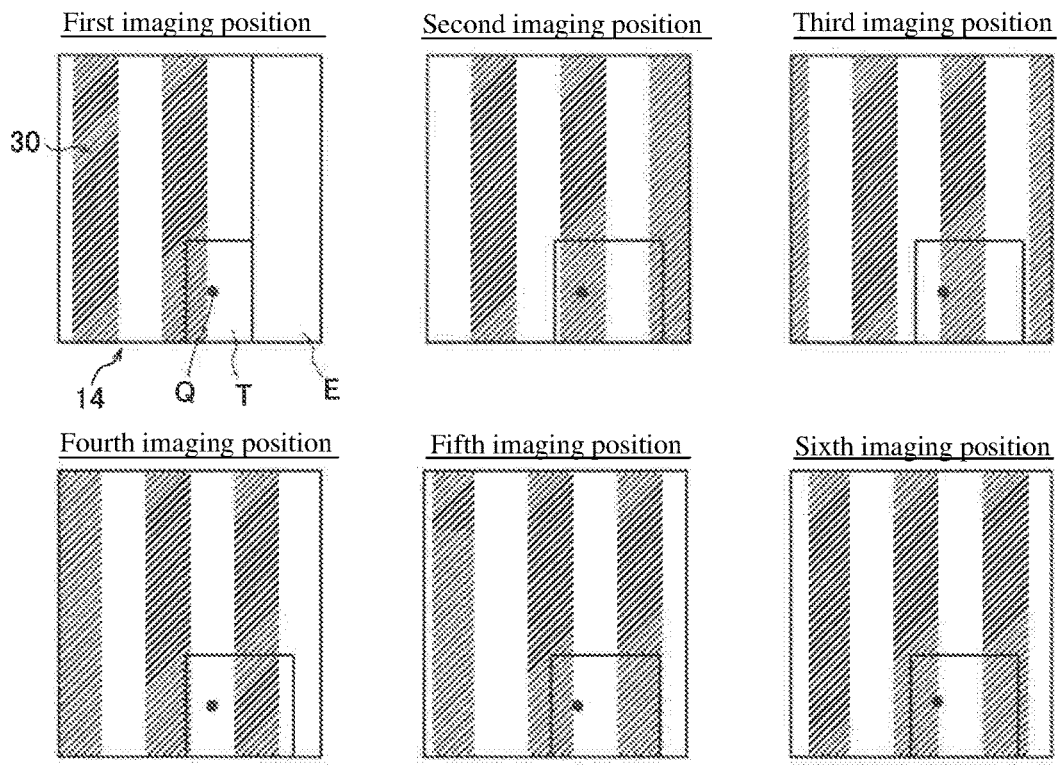
FIG. 8 is a schematic diagram for explaining the alignment of the pixel of the subject of the same position in a plurality of images.

In the first embodiment, the image processing unit 6 acquires the position in each subject image 10 of the pixels of the subject T of the same position using the position calibration data and aligns the pixel in each subject image 10. FIG. 8 is a schematic diagram of each aligned subject image 14. Note that the subject image 14 is an example of "a plurality of images captured while moving a subject" recited in claims.

The example shown in FIG. 8 is a subject image 14 in which each subject image 10 in the first imaging position to the sixth imaging position is aligned so that the subject T in the second imaging position is stationary. Note that in the image captured by arranging the subject T in the first imaging position, since the entire subject T in the X-direction is not reflected, a blank region E is occurring in the subject image 14 after the alignment. In each subject image 14 after the alignment, when focusing on the pixel Q, it is understood that the Moire fringe 30 is moved with respect to the pixel Q.

In the first embodiment, the image processing unit 6 performs the alignment using the position calibration data also for the phase information 12 of the Moire fringe 30 in order to acquire the phase value of the Moire fringe 30 in each pixel of each subject image 14 after the alignment. Also for the phase information 12 of the Moire fringe 30, by performing the same conversion processing as the processing when converted to an image in which the subject T is stationary, the position of the phase information 12 in each imaging position is aligned.

Figure 9:
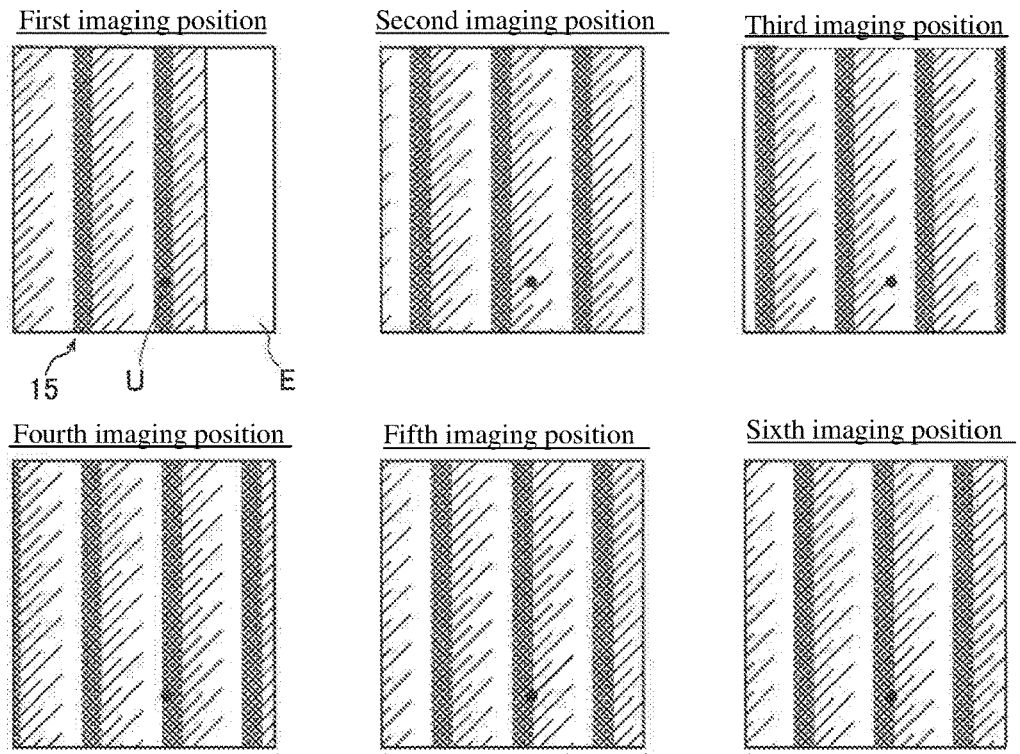
FIG. 9 is a schematic diagram for explaining the alignment of phase information of a Moire fringe.

The example shown in FIG. 9 shows the phase information 15 after the phase information 12 of the Moire fringe 30 shown in FIG. 5 has been aligned using the position calibration data. In the example shown in FIG. 9, the position corresponding to the position of the pixel Q of each subject image 14 after the alignment is illustrated by a point U. That is, the position of the pixel in each imaging position and the position of the phase value of the Moire fringe 30 in the phase information 15 after the alignment correspond in a one-to-one relationship. Therefore, the image processing unit 6 can acquire the intensity signal curve 32 (see FIG. 10) which shows the relationship between the phase value and the pixel value for the pixel in each subject image 14 after the alignment.

Figure 10:
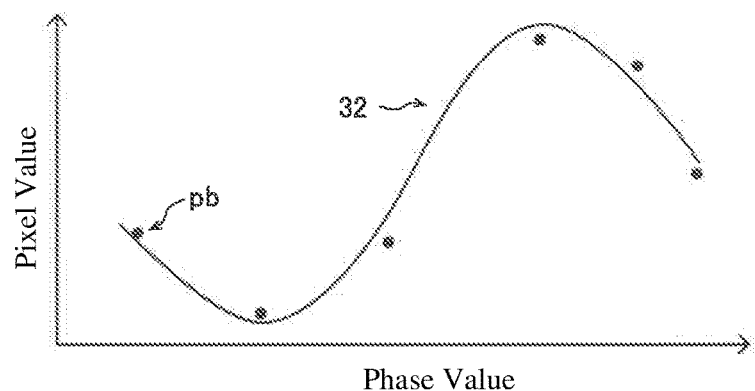
FIG. 10 is a schematic diagram of an intensity signal curve acquired by associating each phase value with each pixel value of each pixel in a plurality of images according to the first embodiment in a one-to-one relationship.

In the intensity signal curve 32 shown in FIG. 10, the horizontal axis represents the phase value and the vertical axis represents the pixel value. The image processing unit 6 acquires the intensity signal curve 32 of the pixel values in which each phase value and each pixel value of the pixel of the subject T of the same position in the plurality of subject images 14 are associated in a one-to-one relationship by using the subject image 14 after the alignment and the phase information 15. The example shown in FIG. 10 is an example of an intensity signal curve 32 acquired by obtaining plots pb based on the pixel value of each pixel Q of the plurality of subject images 14 and a phase value of each point U corresponding to the pixel Q of the subject image 14 in the plurality of phase information 15 and fitting them by a sine wave. Note that for the blank region E shown in FIG. 8, since there is no phase information 12 of the Moire fringe 30, sampling is not performed in FIG. 10. The image processing unit 6 is configured to generate a phase-contrast image 16 based on the acquired intensity signal curve 32.

Figure 11:
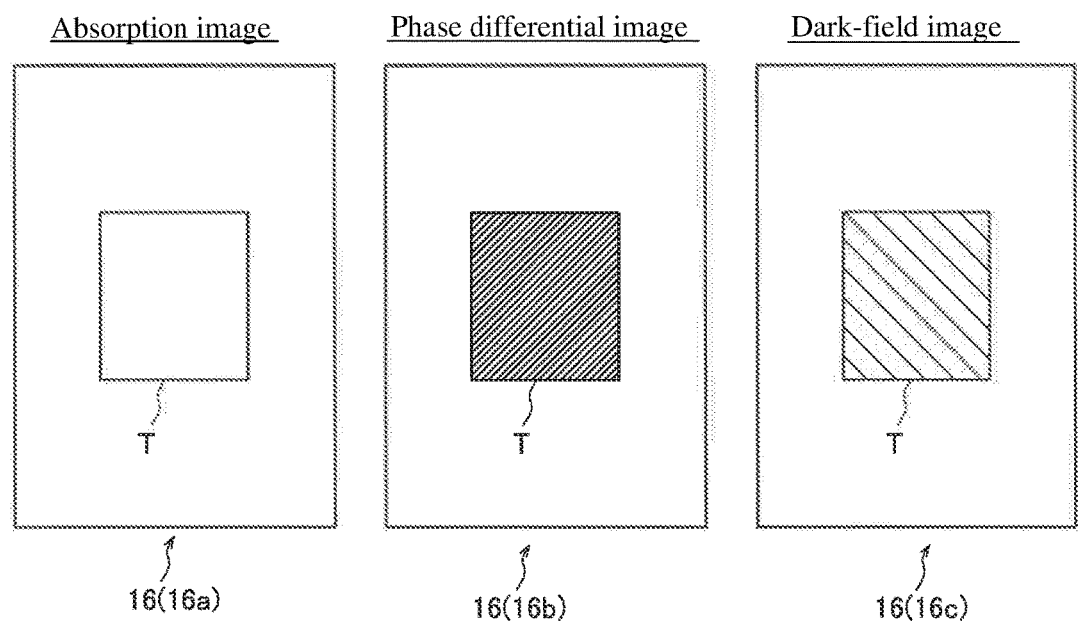
FIG. 11 is a schematic diagram of a phase-contrast image generated by an image processing unit according to the first embodiment.

FIG. 11 is a schematic diagram of the phase-contrast image 16. In the first embodiment, the image processing unit 6 generates an absorption image 16a, a phase differential image 16b, and a dark-field image 16c based on the intensity signal curve 32. The method of generating the absorption image 16a, the phase differential image 16b, and the dark-field image 16c can be performed by known methods, and therefore the explanation thereof will be omitted.

Figure 12:
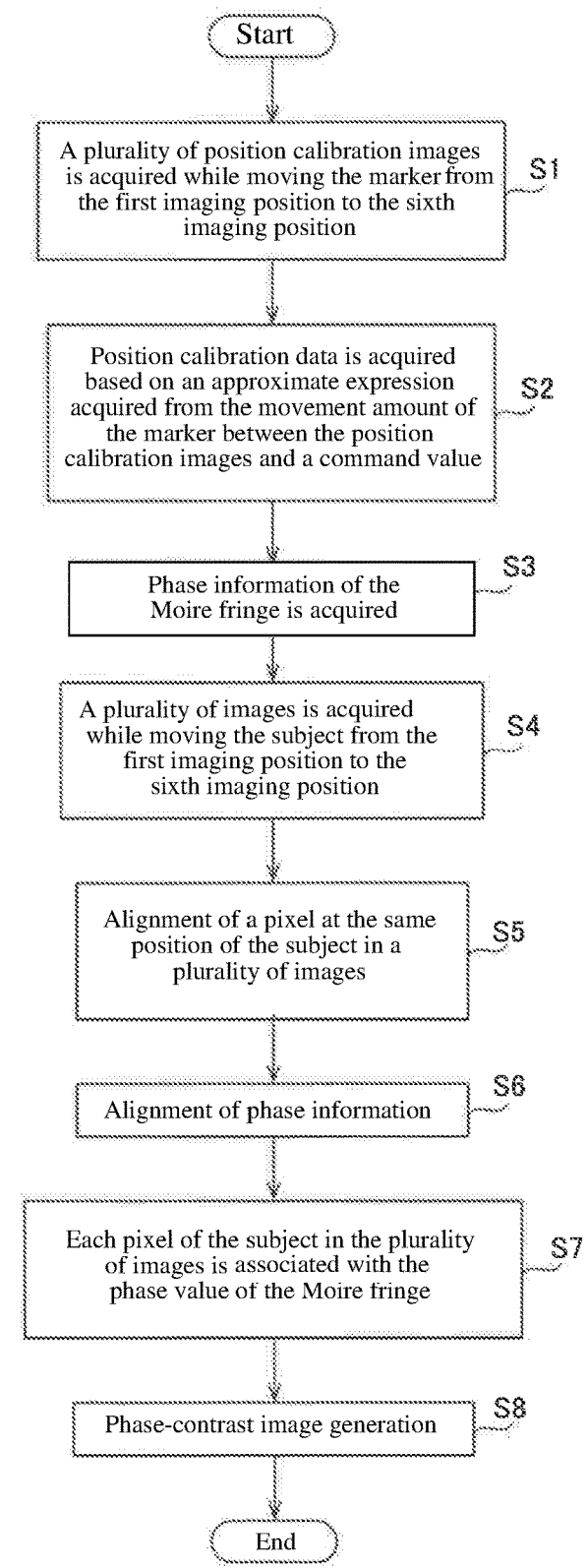
FIG. 12 is a flowchart for explaining generation processing of a phase-contrast image by the X-ray imaging device according to the first embodiment.

Next, referring to FIG. 12, the flow of the processing of generating the phase-contrast image 16 according to the X-ray imaging device 100 of the first embodiment will be described.

In Step S1, the image processing unit 6 acquires a plurality of position calibration images 13 while moving the marker M from the first imaging position to the sixth imaging position by the moving mechanism 8 under the control of the control unit 7. Next, in Step S2, the control unit 7 acquires an approximate expression based on the movement amount dm and a command value of the marker M. The control unit 7 acquires position calibration data based on the inclination of the acquired approximate expression. Thereafter, the processing proceeds to Step S3.

Next, in Step S3, the image processing unit 6 acquires the phase information 12 of the Moire fringe 30. Thereafter, in Step S4, the image processing unit 6 acquires a plurality of subject images 10 while relatively moving the subject T and the imaging system 40 by the moving mechanism 8 under the control of the control unit 7. In the first embodiment, the moving mechanism 8 moves the subject T from the first imaging position to the sixth imaging position. Thereafter, the processing proceeds to Step S5.

Next, in Step S5, the image processing unit 6 aligns the pixel of the subject T of the same position in the plurality of subject images 10 and acquires a plurality of subject images 14. Thereafter, the processing proceeds to Step S6.

In Step S6, the image processing unit 6 aligns the phase information 12 and acquires a plurality of phase information 15. Thereafter, in Step S7, the image processing unit 6 associates the pixel of the subject T in the plurality of subject images 14 with the phase value of the Moire fringe 30. Next, in Step S8, the image processing unit 6 generates the phase-contrast image 16 based on the intensity signal curve 32, and ends the processing.

It should be noted that either the acquisition processing of the position calibration data in Step S1 and Step S2 or the acquisition processing of the phase information 12 of the Moire fringe 30 in Step S3 may be performed first. The acquisition processing of the position calibration data may be performed at any timing as long as the alignment of the pixel in the plurality of subject images 10 is not performed. The processing of acquiring the phase information 12 of the Moire fringe 30 may be performed at any time prior to the processing of performing the alignment of the phase information 12.

Effects of First Embodiment

In this first embodiment, the following effects can be acquired.

In the first embodiment, as described above, the X-ray imaging device 100 is provided with the X-ray source 1, the detector 5 for detecting the X-rays emitted from the X-ray source 1, the plurality of gratings arranged between the X-ray source 1 and the detector 5, the plurality of gratins including the first grating 2 irradiated with the X-rays from the X-ray source 1, the second grating 3 irradiated with the X-rays from the first grating 2, the moving mechanism 8 for moving the subject T along the direction (X-direction) in which the plurality of gratings extends, and the image processing unit 6 for generating the phase-contrast image 16 based on the signal detected by the detector 5. The image processing unit 6 is configured to generate the phase-contrast image 16 by associating the pixel value in each pixel of the subject T in the plurality of subject images 10 with the phase information 12 of the Moire fringe 30 in each pixel based on the plurality of the subject images 10 captured while relatively moving the subject T and the imaging system 40 and the phase information of the Moire fringe 30 occurred in the plurality of subject images 10 and aligning the pixel of the subject T of the same position in the plurality of subject images 10 based on the position information of the pixels of the same position of the subject T in the plurality of images 10 and the pixel value of each pixel associated with the phase value.

With this, the phase-contrast image 16 can be generated by associating the pixel value of the pixel of the subject T of the same position in each image with each phase value corresponding to the pixel of the subject T of the same position in each image. Therefore, it is possible to generate the phase-contrast image 16 using the pixel value of each pixel reflecting the same position, as compared with the case in which the phase-contrast image 16 is generated using the average value of the pixel values contained in each region acquired by dividing the region of one period d4 of the Moire fringe 30 into regions. Consequently, it is possible to suppress the deterioration of the image quality of the phase-contrast image 16 due to the occurrence of an error in the pixel value used for generating the phase-contrast image 16.

Further, for example, even in the case of capturing a calibration image without arranging a subject T, since it is possible to relatively move the subject T and the imaging system 40, before or after the relative movement of the subject T and the imaging system 40, the subject T can be arranged at a position other than the imaging region. Therefore, since the user is not required to remove the subject T from the imaging region in order to capture a correction image as in the conventional fringe scanning method of moving a grating, as compared with the conventional fringe scanning method, it is possible to shorten the time interval between the image capturing of the phase-contrast image 16 and the image capturing of the correction image. As a result, it is possible to suppress the change in the imaging conditions between the image capturing operations, it is possible to suppress the deterioration of the image quality of the phase-contrast image 16 after the calibration. Further, for example, in cases where it is desired to image a subject T whose size w1 in the moving direction (X-direction) of the subject T is larger than the size w2 of a grating in the moving direction (X-direction) of the subject T, in a conventional fringe scanning method, it is required to increase the size of the second grating 3. Since the second grating 3 used in a fringe scanning method must have a narrow pitch and a high aspect ratio, it is difficult to produce a second grating 3 which is a single grating having a large area. Therefore, for example, it is possible to increase the area by bonding gratings, but an artifact occurs at the interface of the bonding. In contrast, in this embodiment, by configuring as described above, since it is possible to perform image capturing while moving a subject T, without using a grating having an enlarged area, it is possible to image the entire subject T. Consequently, for example, it is possible to suppress an artifact that occurs when using a grating having an increased area by bonding gratings.

Further, in the first embodiment, as described above, the image processing unit 6 is configured to generate position calibration data to be used for aligning each pixel of the subject T of the same position in the plurality of subject images 10, based on a plurality of position calibration images 13 captured while relatively moving the marker M and the imaging system 40. With this, by using the position calibration data, it is possible to acquire the position in each subject image 10 of the pixel of the subject T of the same position, and therefore it is possible to calculate the movement amount dt of the subject T. As a result, for example, even in cases where the movement amount dt of the subject T and the movement amount dm of the marker M are not the same, the movement amount dt of the subject T can be acquired, so that the alignment of the pixel of the subject T of the same position in the plurality of subject images 10 can be performed.

Further, in the first embodiment, as described above, the position calibration data is generated based on the command value related to the movement amount inputted to the moving mechanism 8 when relatively moving the marker M and the imaging system 40 by the moving mechanism 8 and the movement amount dm of the marker M in the position calibration image 13 when relatively moving the marker M and the imaging system 40 based on the command value. With this, it is possible to acquire an accurate movement amount by the position calibration data even in cases where there is an error between a command value related to a movement amount inputted to the moving mechanism 8 and the movement amount dm of the marker M. As a result, it is possible to accurately align each pixel of the subject T of the same position in the plurality of subject images 10, so that it is possible to further suppress the deterioration of the resulting image quality of the phase-contrast image 16.

Further, in the first embodiment, as described above, the position calibration data is generated by acquiring the approximate expression indicating the relationship between the command value and the movement amount dm of the marker M based on the position of each pixel of the marker M of the same position in the plurality of position calibration images 13. Thus, by acquiring the approximate expression based on the position of each pixel of the marker M of the same position in the plurality of position calibration images 13, the relationship between the command value related to the movement amount to a position different from the position where the plurality of position calibration images 13 were captured and the movement amount dm of the marker M can be calculated using the approximate expression. Consequently, for example, when imaging the subject T, even in cases where the subject T is moved to a position different from the position where the marker M was moved, it is possible to acquire the movement amount dt of the subject T.

Further, in the first embodiment, as described above, the image processing unit 6 is configured to generate the phase-contrast image 16 based on the intensity signal curve 32 of the pixel values acquired by associating each phase value with each pixel value of the pixel of the subject T of the same position in the plurality of subject images 10 in a one-to-one relationship. Thus, since each phase value and each pixel value of the pixel of the subject T of the same position in the plurality of subject images 10 correspond to each other in a one-to-one relationship, the error of the intensity signal curve 32 can be reduced as compared with the case in which the average value of the phase value and the pixel value is used. Consequently, it is possible to further reduce the occurrence of errors in the resulting phase-contrast image 16.

In the first embodiment, as described above, the plurality of gratings further includes the third grating 4 arranged between the X-ray source 1 and the first grating 2. With this, it is possible to enhance the coherence of X-rays emitted from the X-ray source 1 by the third grating 4. As a result, since the self-image of the first grating 2 can be formed without depending on the focal diameter of the X-ray source 1, the degree of flexibility in selecting the X-ray source 1 can be improved.

Second Embodiment

Figure 13:
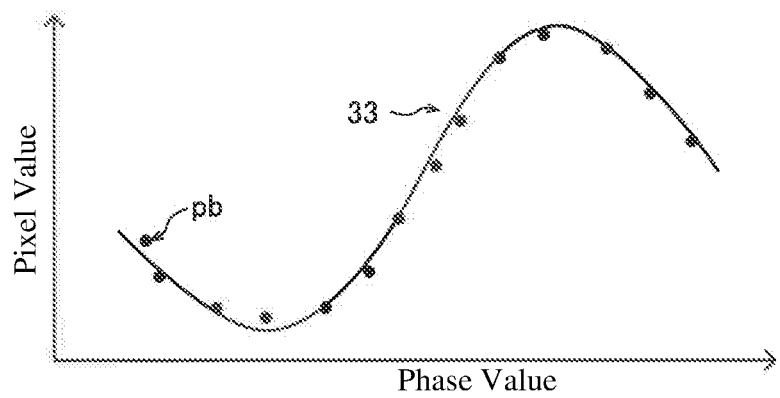
FIG. 13 is a schematic diagram of an intensity signal curve acquired by associating each phase value with each pixel value of each pixel in a plurality of images according to a second embodiment in a one-to-one relationship.

Next, referring to FIG. 1 and FIG. 13, an X-ray imaging device 200 according to a second embodiment (see FIG. 1) will be described. Unlike the first embodiment in which image capturing is performed while moving the subject T from the first imaging position to the sixth imaging position, in the second embodiment, the moving mechanism 8 is configured to continuously move the subject T when imaging the subject T. Note that the same component as that of the above-described first embodiment is denoted by the same reference symbol, and the description thereof is omitted.

(Configuration of X-Ray Imaging Device)

First, referring to FIG. 1, the configuration of the X-ray imaging device 200 according to the second embodiment will be described.

In the second embodiment, the moving mechanism 8 is configured to continuously move the subject T when imaging the subject T. The image processing unit 6 is configured to generate the phase-contrast image 16 based on the acquired continuous subject image 10. That is, in the second embodiment, the subject image 10 is acquired as a moving image acquired by continuously capturing images of the subject image 10 at predetermined frame rates (time intervals).

In the second embodiment, in order to acquire the subject image 10 as a moving image, the control unit 7 acquires the following expression (4) as position calibration data.

$$x_i = x_{start} + p1 \times vp \times (1/fps) \times i \quad (4)$$

Here, $x_i$ is the position of the pixel of the subject T of the same position of the $i^{th}$ frame. $x_{start}$ is the position of the pixel in the first frame among the pixels of the subject T of the same position. vp is a speed (pulse/s) when the moving mechanism 8 moves the subject T. Further, fps is a frame rate (frame/s) at the time of capturing a moving image. Further, i is a frame number in the moving image.

In the second embodiment, the subject image 10 acquired as a moving image is aligned using the position calibration data, and the phase information 12 is also aligned using the position calibration data. Similar to the first embodiment, the image processing unit 6 acquires the intensity signal curve 33 shown in FIG. 13 by associating the pixel value of each pixel of the subject image 14 with the phase value of the Moire fringe 30 based on the pixel of each subject image 14 after the alignment and the phase information 15 after the alignment. In the intensity signal curve 33, similar to the intensity signal curve 32 in the first embodiment, the horizontal axis represents the phase value, and the vertical axis represents the pixel value. In the second embodiment, similarly to the first embodiment, the image processing unit 6 generates the phase-contrast image 16 based on the intensity signal curve 33.

Figure 14:
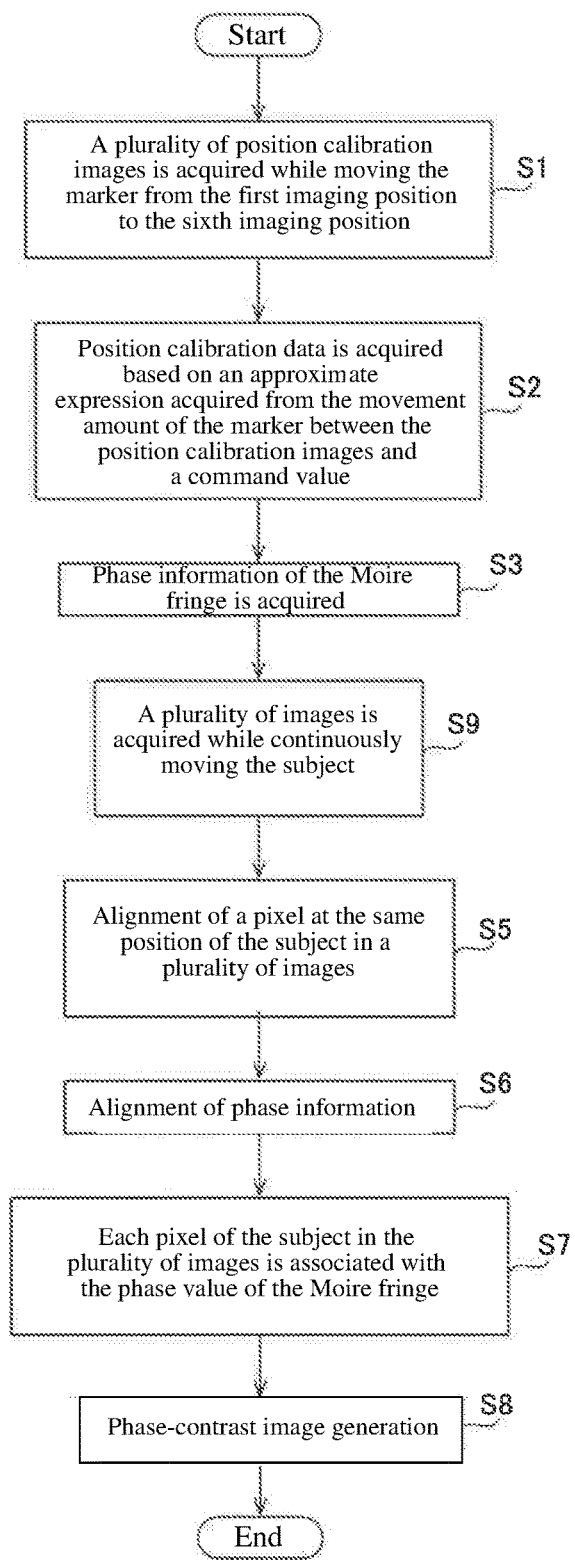
FIG. 14 is a flowchart for explaining generation processing of a phase-contrast image by the X-ray imaging device according to the second embodiment.

Next, referring to FIG. 14, the flow of the processing of generating the phase-contrast image 16 according to the X-ray imaging device 200 of the second embodiment will be described. Note that the description of the same Step as in the first embodiment will be omitted.

In Step S1 to Step S3, the control unit 7 acquires the position calibration data and the phase information 12 of the Moire fringe 30. Thereafter, the processing proceeds to Step S9.

In Step S9, the control unit 7 acquires a plurality of subject images 10 while continuously moving the subject T by the moving mechanism 8.

Thereafter, the processing proceeds from Step S5 to Step S8, the image processing unit 6 generates the phase-contrast image 16, and the processing ends.

The rest of the configuration of the second embodiment is the same as that of the first embodiment.

Effects of Second Embodiment

In this second embodiment, the following effects can be obtained.

In the second embodiment, as described above, the moving mechanism 8 is configured to continuously move the subject T when imaging the subject T. The image processing unit 6 is configured to generate the phase-contrast image 16 based on the acquired continuous subject images 10. With this, in generating the continuous phase-contrast images 16, unlike a conventional fringe scanning method of generating a continuous phase-contrast image 16 by repeating, for example, the movement and the imaging of the subject T, by imaging while continuously moving the subject T, it is possible to generate continuous phase-contrast images 16. As a result, the imaging time can be shortened in comparison with a conventional fringe scanning method.

The other effects of the second embodiment are the same as those of the above-described first embodiment.

Third Embodiment

Next, referring to FIG. 15 to FIG. 19, an X-ray imaging device 300 according to a third embodiment (see FIG. 15) will be described. Unlike the first and second embodiments in which the phase-contrast image 16 is generated based on the subject image 10 captured by passing the subject T through a region irradiated with X-rays that have passed through the first grating 2, in a third embodiment, the detector 5 includes a first detection region R1 (see FIG. 15) for detecting the X-rays that have passed through the first grating 2 and a second detection region R2 (see FIG. 15) for detecting the X-rays that have arrived without passing through the first grating 2. The moving mechanism 8 is configured to relatively move the subject T and the imaging system 40 such that the subject T passes through the first detection region R1 and the second detection region R2, respectively. The same configurations as those of the first and second embodiments are denoted by the same reference symbols, and the descriptions thereof will be omitted.

(Configuration of X-Ray Imaging Device)

Figure 15:
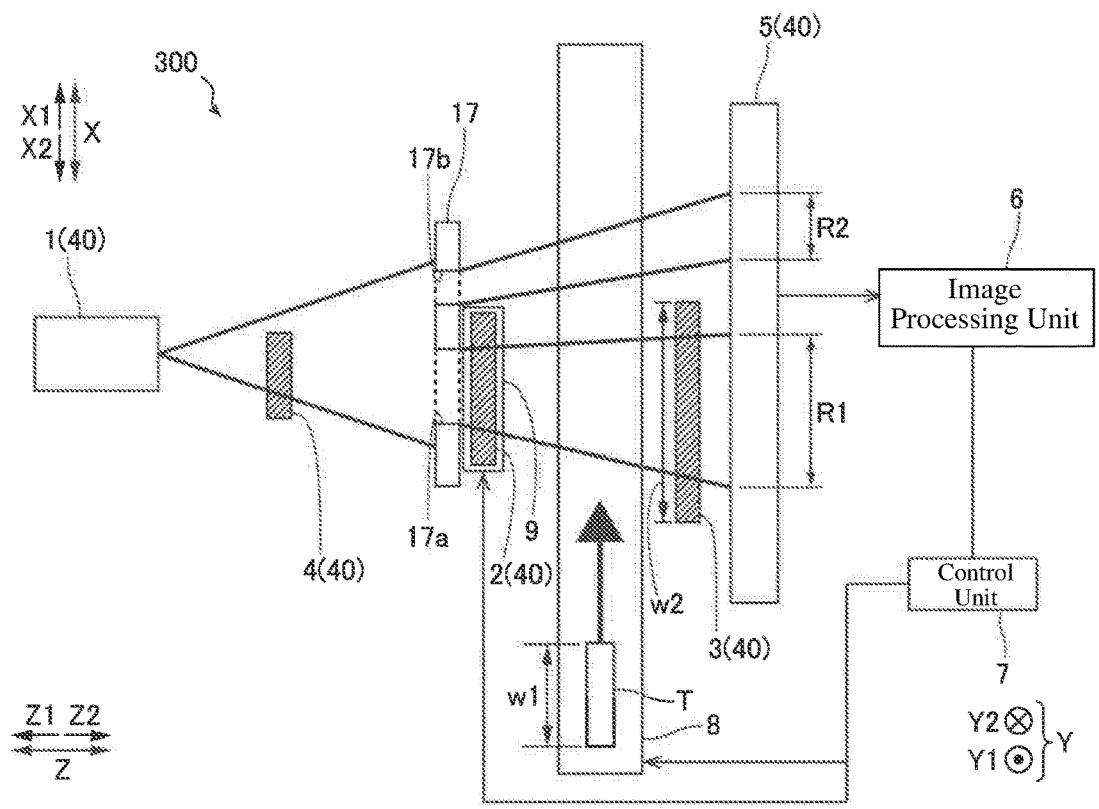
FIG. 15 is a schematic diagram of a plurality of position calibration images captured by an X-ray imaging device according to a third embodiment.

First, referring to FIG. 15, the configuration of the X-ray imaging device 300 according to the third embodiment will be described.

In the third embodiment, the detector 5 includes the first detection region R1 for detecting X-rays that have arrived through the first grating 2 and the second detection region R2 for detecting X-rays that have arrived without passing through the first grating 2. The moving mechanism 8 is configured to relatively move the subject T and the imaging system 40 such that the subject T passes through the first detection region R1 and the second detection region R2. In the third embodiment, the X-ray imaging device 300 includes a collimator 17. The collimator 17 is arranged between the third grating 4 and the first grating 2. The collimator 17 is constituted by a shielding member for shielding X-rays and is formed with collimator holes 17a and 17b which are configured to be freely opened and closed. The collimator hole 17a can adjust the irradiation range of the X-rays emitted to the detector 5 through the first grating 2 among the X-rays emitted from the X-ray source 1. The collimator hole 17b is capable of adjusting the irradiation range of X-rays emitted to the detector 5 without passing through the first grating 2. The size of the first detection region R1 in the X-direction is adjusted to a size at which at least one period d4 of the Moire fringe 30 (see FIG. 4) is reflected. Since the second detection region R2 is a region for capturing the absorption image 21 (see FIG. 18) in which no grating is interposed, the size of the second detection region R2 in the X-direction may be smaller than the size of one period d4 of the Moire fringe 30.

Figure 16:
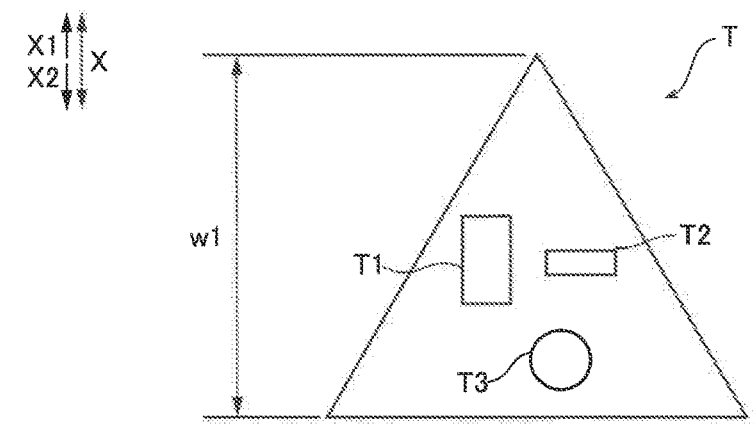
FIG. 16 is a schematic diagram for explaining a subject captured by the X-ray imaging device according to the third embodiment.

FIG. 16 is a schematic diagram illustrating the subject T to be imaged by the X-ray imaging device 300 in the third embodiment as viewed from the Z-direction. The subject T to be imaged in the third embodiment is an example in which the size w1 in the X-direction is larger than the width w2 of the second grating 3 in the X-direction. The subject T includes a first internal structure T1, a second internal structure T2, and a third internal structure T3. The first internal structure T1 is an internal structure larger in the absorption amount of X-rays as compared with the second internal structure T2 and the third internal structure T3. The X-ray absorption amounts of the second internal structure T2 and the third internal structure T3 are the degrees that cannot be depicted in the absorption image. The second internal structure T2 and the third internal structure T3 are internal structures that easily scatter X-rays as compared with the first internal structure T1. Also, the X-ray scattering amount of the first internal structure T1 is a degree that cannot be depicted in the dark-field image.

In the third embodiment, since the size w1 of the subject T in the X-direction is larger than the width w2 of the second grating 3, the entire subject T in the X-direction cannot be imaged in one image. Therefore, in the third embodiment, the image processing unit 6 is configured to generate a phase-contrast image 16 based on a plurality of first images 18 acquired in the first detection region R1 and generate an absorption image 21 based on a plurality of second images 20 acquired in the second detection region R2.

Figure 17:
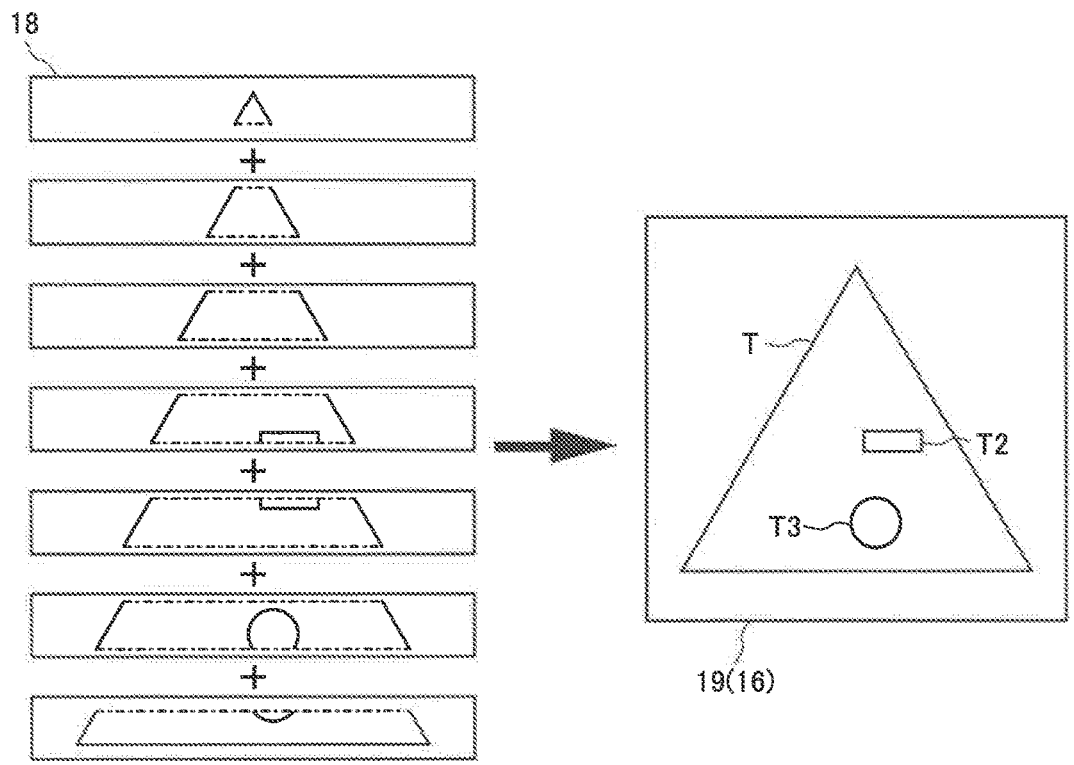
FIG. 17 is a schematic diagram of a plurality of first images and a dark-field image acquired by composing them that are generated by an image processing unit according to the third embodiment.

FIG. 17 is a schematic diagram of the first images 18 acquired by the image processing unit 6 and a phase-contrast image 16 to be generated.

As shown in FIG. 17, in the third embodiment, the image processing unit 6 acquires a plurality of first images 18 captured while moving the subject T in the X-direction. The first image 18 is a dark-field image acquired in the same manner as the dark-field image 16c generated by the image processing unit 6 in the first embodiment. The image processing unit 6 generates a dark-field image 19 based on the plurality of first images 18. In the third embodiment, since the second internal structure T2 and the third internal structure T3 are internal structures that are likely to scatter X-rays as compared with the first internal structure T1, it is possible to confirm the second internal structure T2 and the third internal structure T3 in the dark-field image 19.

Figure 18:
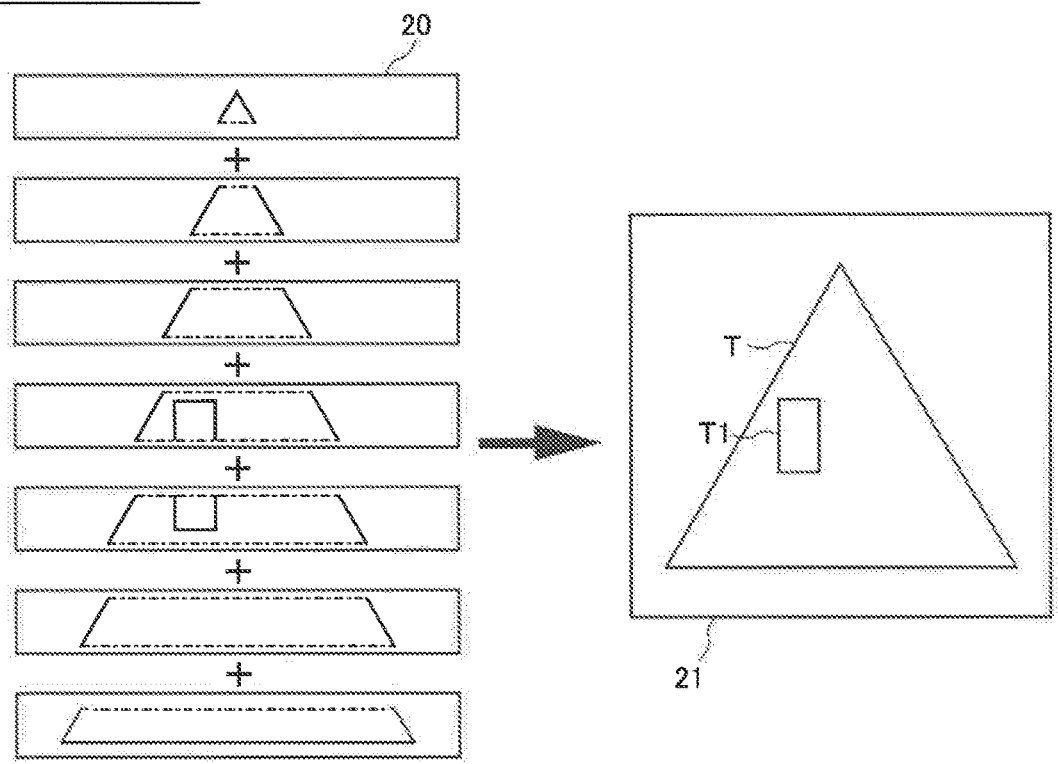
FIG. 18 is a schematic diagram of a plurality of second images and an absorption image acquired by composing them that are generated by the image processing unit according to the third embodiment.

FIG. 18 is a schematic diagram of second images 20 acquired by the image processing unit 6 and an absorption image 21 to be generated. In the third embodiment, the image processing unit 6 acquires a plurality of second images 20 captured while moving the subject T in the X-direction. The image processing unit 6 generates an absorption image 21 based on the plurality of acquired second images 20. In the third embodiment, since the first internal structure T1 is an internal structure larger in the X-ray absorption amount, as compared with the second internal structure T2 and the third internal structure T3, the first internal structure T1 can be confirmed in the absorption image 21.

In the third embodiment, the image processing unit 6 is configured to generate a composite image 22 in which the dark-field image 19 and the absorption image 21 are composed.

Figure 19:
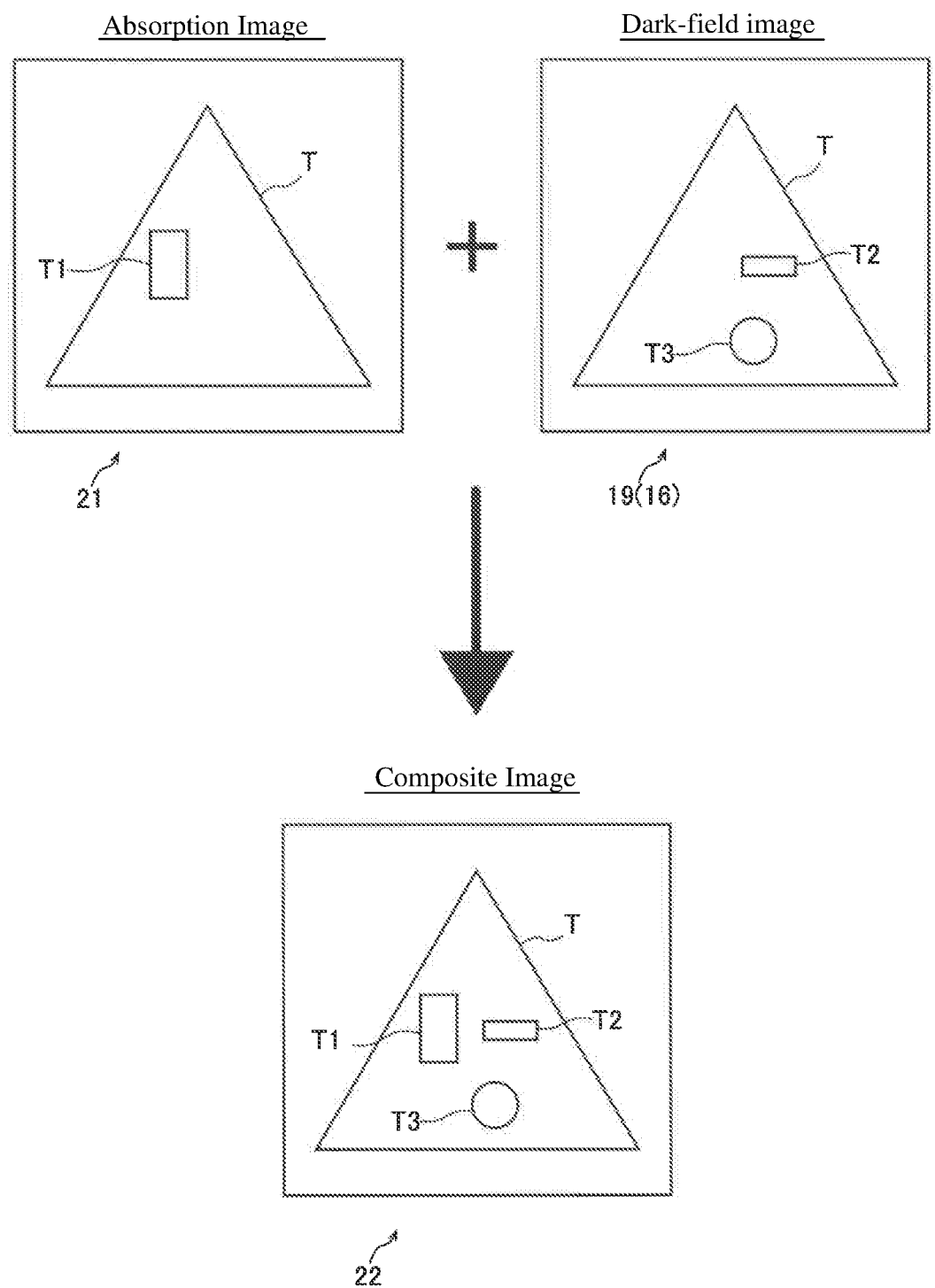
FIG. 19 is a schematic diagram of an absorption image, a dark-field image, and a composite image in which they are composed that are produced by the image processing unit according to the third embodiment.

FIG. 19 is a schematic diagram of the dark-field image 19, the absorption image 21, and the composite image 22 in which the dark-field image 19 and the absorption image 21 are composed, which are generated by the image processing unit 6 in the third embodiment.

As shown in FIG. 19, in the composite image 22, the second internal structure T2 and the third internal structure T3 which can be confirmed in the dark-field image 19, and the first internal structure T1 which can be confirmed in the absorption image 21 can be confirmed at the same time (in a single image).

Next, referring to FIG. 20, a flow of the processing of generating the composite image 22 in the X-ray imaging device 300 according to the third embodiment will be described.

In Step S10, the control unit 7 acquires the position calibration data and the phase information 12 of the Moire fringe 30. The processing of acquiring the position calibration data and the phase information 12 of the Moire fringe 30 in Step S10 is the same as the processing of Step S1 to Step S3 in the first embodiment, and therefore the detailed explanation thereof will be omitted. Thereafter, the processing proceeds to Step S11.

In Step S11, the image processing unit 6 acquires a plurality of first images 18 and a plurality of second images 20 captured while moving the subject T. Thereafter, in Step S12, the image processing unit 6 generates the dark-field image 19 based on the plurality of first images 18. Thereafter, the processing proceeds to Step S13.

In Step S13, the image processing unit 6 generates the absorption image 21 based on the plurality of second images 20. Thereafter, in Step S14, the image processing unit 6 generates the composite image 22 in which the dark-field image 19 and the absorption image 21 are composed, and the processing ends.

The rest of the configuration of the third embodiment is the same as that of the first and second embodiments.

Effects of Third Embodiment

In the third embodiment, the following effects can be acquired.

In the third embodiment, as described above, the detector 5 includes the first detection region R1 for detecting X-rays that have arrived through the first grating 2 and the second detection region R2 for detecting X-rays that have arrived without passing through the first grating 2. The moving mechanism 8 is configured to relatively move the subject T and the imaging system 40 such that the subject T passes through the first detection region R1 and the second detection region R2, respectively. The image processing unit 6 is configured to generate the dark-field image 19 based on the plurality of first images 18 acquired in the first detection region R1 and generate the absorption image 21 based on the plurality of second images 20 acquired in the second detection region R2. With this, without performing image capturing by retracting a plurality of gratings, or without performing image capturing using another imaging device not provided with a grating, it is possible to generate the absorption image 21 captured without interposing a grating and the dark-filed image 19 captured using a grating. Since the X-rays reaching the second detection region R2 reach the detector 5 without passing through a grating, it is possible to suppress the attenuation of the X-rays by the grating, in particular, the attenuation of the X-rays by the low-energy sides. As a result, the contrast of the absorption image 21 generated by the X-rays reaching the second detection region R2 can be improved as compared with the contrast of the absorption image 16a generated by the X-rays reaching the first detection region R1.

In the third embodiment, as described above, the image processing unit 6 is configured to generate the composite image 22 in which the dark-field image 19 and the absorption image 21 are composed. With this, it is possible to acquire the composite image 22 in which the high-contrast absorption image 21 generated by the X-rays detected in the second detection region R2 and the dark-field image 19 are composed. As a result, since the contrast of absorption image 21 can be improved, the image quality of the composite image 22 can be improved.

The other effects of the third embodiment are the same as those of the above-described first and second embodiments.

(Modifications)

It should be understood that the embodiments disclosed here are examples in all respects and are not restrictive. The scope of the present invention is indicated by the appended claims rather than by the description of the above-described embodiments and includes all modifications (changes) within the meanings and the scopes equivalent to the scope of the claims.

For example, in the above-described first to third embodiments, an example is shown in which the grating moving mechanism 9 moves the first grating 2, but the present invention is not limited thereto. A grating to be moved may be any grating.

In the above-described first to third embodiments, an example is shown in which the X-ray imaging device 100 (200, 300) is provided with the third grating 4, but the present invention is not limited thereto. In cases where the coherence of the X-rays emitted from the X-ray source 1 is sufficiently high so that it is possible to form a self-image of the first grating 2, it is not necessary to provide the third grating 4.

Also, in the above-described first embodiment, an example is shown in which the image capturing is performed while moving the subject T (marker M) to six positions of the first imaging position to the sixth imaging position has been described, but the present invention is not limited thereto. When it is possible to acquire the intensity signal curve 32, the number of positions for arranging the subject T (marker M) may be less than six or more than six.

In the above-described first embodiment, an example is shown in which the subject T is moved by the same movement amount dt as the movement amount dm of the marker M, but the present invention is not limited thereto. The movement amount dt of the subject T and the movement amount dm of the marker M may not be the same.

In the above-described first to third embodiments, an example is shown in which the subject T (marker M) is moved between the first grating 2 and the second grating 3, but the present invention is not limited thereto. For example, it may be configured to move the subject T (marker M) between the third grating 4 and the first grating 2.

In the above-described first to third embodiments, an example is shown in which the position calibration data is generated by acquiring an approximate expression based on a command value and a movement amount, but the present invention is not limited thereto. When the location of the pixel in each subject image 10 can be acquired, the position calibration data may be generated in any manner.

In addition, in the above-described third embodiment, an example is shown in which the image processing unit 6 generates dark-field images as a plurality of first image 18, but the present invention is not limited thereto. The image processing unit 6 may be configured to generate phase differential images 16b as a plurality of first images 18. The image processing unit 6 may be configured to generate a composite image 22 in which the absorption image 21 and the phase differential image 16b are composed.

In addition, in the above-described third embodiment, an example is shown in which the image processing unit 6 generates the composite image 22 in which the dark-field image 19 and the absorption image 21 are composed, but the present invention is not limited thereto. For example, the image processing unit 6 may be configured to display the dark-field image 19 and the absorption image 21 side by side by outputting the dark-field image 19 and the absorption image 21 to an external display device or the like.

In the above-described first to third embodiments, an example is shown in which the acquisition of the position calibration data and the phase information 12 of the Moire fringe 30 and the image capturing of the subject T are performed successively, but the present invention is not limited thereto. The processing of acquiring the position calibration data and the phase information 12 of the Moire fringe 30 may be performed in advance and stored in a storage unit or the like. In the case of the calibration in which the position calibration data and the phase information 12 of the Moire fringe 30 are stored in the storage unit, the image processing unit 6 may be configured to acquire the phase information 12 of the position calibration data and the Moire fringe 30 from the storage unit when generating the phase-contrast image 16.

In the above-described first to third embodiments, an example is shown in which the moving mechanism 8 moves the subject T (marker M) from the X2-direction to the X1-direction, but the present invention is not limited thereto. For example, the moving mechanism 8 may be configured to move the subject T (marker M) from the X1-direction to the X2-direction. If it is possible to move the subject T (marker M) in the periodic direction of the Moire fringe 30, the moving mechanism 8 may move the subject T (marker M) in any way.

Further, in the first and second embodiments, an example is shown in which the X-ray imaging device 100 (200) captures the image of the subject T whose size W1 of the subject T in the X-direction is smaller than the width w2 of the second grating 3, the present invention is not limited thereto. For example, as in the third embodiment, it may be configured to image the subject X whose size w1 in the X-direction is larger than the width w2 of the second grating 3. Further, in the third embodiment, as in the first and second embodiments, the X-ray imaging device 300 may be configured to image the subject T whose size w1 in the X-direction is smaller than the width w2 of the second grating 3. By performing image capturing while moving the subject T, it is possible to generate an image in which the entire subject T is reflected, so that there is no restriction on the size of the subject T in the X-direction.

In the above-described first to third embodiments, an example is shown in which image capturing is performed in a state in which the imaging system 40 is fixed and the moving mechanism 8 moves the subject T, but the present invention is not limited thereto. For example, the moving mechanism 8 may be configured to relatively move the subject T and the imaging system 40 by moving the imaging system 40 with the subject T fixed. Further, it may be configured to acquire the position calibration data by moving the imaging system 40 with the marker M fixed. Since it is enough that the relative position of the subject T (marker M) and the imaging system 40 change, the moving mechanism 8 may move either of the subject T (marker M) and the imaging system 40. In the first and second embodiments, when the moving mechanism 8 moves the imaging system 40, the moving mechanism 8 may be configured to move the grating moving mechanism 9 together with the grating. Further, in the third embodiment, when the moving mechanism 8 moves the imaging system 40, the moving mechanism 8 may be configured to move the collimator 17 together with the imaging system 40.

DESCRIPTION OF SYMBOLS

1: X-ray source
2: First grating
3: Second grating
4: Third grating
5: Detector
6: Image processing unit
7: Control unit
8: Moving mechanism
9: Grating Moving Mechanism
10, 14: Subject image (Several images captured while moving a subject)
12, 15: Phase information
13: Position calibration image
16: Phase-contrast image
16a: Absorption image (phase-contrast image)
16b: Phase differential image (phase-contrast image)
16c, 19: Dark-field image (phase-contrast image)
18: First image
20: Second image
21: Absorption image
22: Composite image
30: Moire fringe
32, 33: Intensity signal curve
40: Imaging system
100, 200, 300: X-ray imaging device
M: Marker
R1: First detection region
R2: Second detection region
T: T: subject

The invention claimed is:

1. An X-ray imaging device comprising:
an X-ray source;
a detector configured to detect X-rays emitted from the X-ray source;
a plurality of gratings arranged between the X-ray source and the detector, the plurality of gratings including a first grating configured to be irradiated with X-rays from the X-ray source and a second grating configured to be irradiated with X-rays from the first grating;
a moving mechanism configured to move a subject or an imaging system along a direction in which the plurality of gratings extends, the imaging system being composed of the X-ray source, the detector, and the plurality of gratings; and
an image processing unit configured to generate a phase-contrast image based on a signal detected by the detector,
wherein the image processing unit is configured to:
based on a plurality of images captured by relatively moving the subject and the imaging system and phase information of the Moire fringe generated in the plurality of images, associate a pixel value of each pixel on which a subject appears in the plurality of images with a phase value of a Moire fringe in a corresponding pixel; and
generate the phase-contrast image by aligning a pixel on which the subject appears on the corresponding position in the plurality of images based on position information of the pixel on which the subject appears on the corresponding position in the plurality of images and a pixel value of each pixel associated with the phase value.

2. The X-ray imaging device as recited in claim 1,
wherein the image processing unit is configured to generate position calibration data to be used for aligning the pixel of the subject of the same position in the plurality of images based on a plurality of position calibration images captured while relatively moving a marker and the imaging system.

3. The X-ray imaging device as recited in claim 2,
wherein the position calibration data is generated based on a command value related to a movement amount inputted to the moving mechanism when relatively moving the marker and the imaging system by the moving mechanism and a movement amount of the marker in the position calibration image or the imaging system when the marker and the imaging system are relatively moved based on the command value.

4. The X-ray imaging device as recited in claim 3,
wherein the position calibration data is generated by acquiring an approximate expression indicating a relationship between the command value and the movement amount of the marker or the imaging system based on a position of each pixel of the marker of the same position in the plurality of position calibration images.

5. The X-ray imaging device as recited in claim 3,
wherein the image processing unit is configured to generate the phase-contrast image based on an intensity signal curve of pixel values acquired by associating each phase value of each pixel of the subject of the same position in the plurality of images with each pixel value thereof in a one-to-one relationship.

6. The X-ray imaging device as recited in claim 1,
wherein the moving mechanism is configured to continuously move the subject or the imaging system when imaging the subject, and
wherein the image processing unit is configured to generate the phase-contrast image based on the acquired continuous images.

7. The X-ray imaging device as recited in claim 1,
wherein the detector includes a first detection region for detecting X-rays arrived by passing through the first grating and a second detection region for detecting X-rays arrived without passing through the first grating,
wherein the moving mechanism is configured to relatively move the subject and the imaging system so that the subject passes through the first detection region and the second detection region, respectively, and
wherein the image processing unit is configured to generate the phase-contrast image based on a plurality of first images acquired in the first detection region and generate an absorption image based on a plurality of second images acquired in the second detection region.

8. The X-ray imaging device as recited in claim 7,
wherein the image processing unit is configured to generate a composite image in which the phase-contrast image and the absorption image are composed.

9. The X-ray imaging device as recited in claim 1, wherein the plurality of gratings further includes a third grating arranged between the X-ray source and the first grating.

* * * * *